United States Patent [19]
Lim

[11] Patent Number: 5,640,486
[45] Date of Patent: *Jun. 17, 1997

[54] ENCODING, DECODING AND COMPRESSION OF AUDIO-TYPE DATA USING REFERENCE COEFFICIENTS LOCATED WITHIN A BAND A COEFFICIENTS

[75] Inventor: Jae S. Lim, Winchester, Mass.

[73] Assignee: Massachusetts Institute of Technology, Cambridge, Mass.

[*] Notice: The term of this patent shall not extend beyond the expiration date of Pat. No. 5,364,724.

[21] Appl. No.: 345,879

[22] Filed: Nov. 28, 1994

Related U.S. Application Data

[63] Continuation of Ser. No. 879,635, May 7, 1992, Pat. No. 5,369,724, which is a continuation-in-part of Ser. No. 822, 247, Jan. 17, 1992, Pat. No. 5,394,508.

[51] Int. Cl.$^6$ ............................... G10L 9/00; G10L 3/02
[52] U.S. Cl. ............................................................ 395/2.15
[58] Field of Search ............. 381/29–40; 395/2.14–2.19, 395/2.38, 2.39

[56] References Cited

U.S. PATENT DOCUMENTS

| | | |
|---|---|---|
| 4,464,782 | 8/1984 | Béraud et al. ........................... 381/31 |
| 4,899,384 | 2/1990 | Crouse et al. ........................... 381/31 |
| 5,222,189 | 6/1993 | Fielder ........................................ 395/2 |
| 5,369,724 | 11/1994 | Lim ....................................... 395/2.15 |

FOREIGN PATENT DOCUMENTS

0457390A1  11/1991  European Pat. Off. ......... H04B 1/66

*Primary Examiner*—Allen R. MacDonald
*Assistant Examiner*—John Michael Grover
*Attorney, Agent, or Firm*—Steven J. Weissburg

[57] ABSTRACT

An audio type signal is encoded. The signal is first divided into bands. For each band, a yardstick signal element is selected. The yardstick may be the signal element having the largest magnitude in the band, the second largest, closest to the median magnitude, or having some other selected magnitude. This magnitude is used for various purposes, including assigning bits to the different bands, and for establishing reconstruction levels within a band. The magnitude of non yardstick signal elements is also quantized. The encoded signal is also decoded. Apparatus for both encoding and decoding are also disclosed. The location of the yardstick element within its band may also be recorded and encoded, and used for efficiently allocating bits to non-yardstick signal elements. Split bands may be established, such that each split band includes a yardstick signal element and each full band includes a major and a minor yardstick signal element.

8 Claims, 10 Drawing Sheets

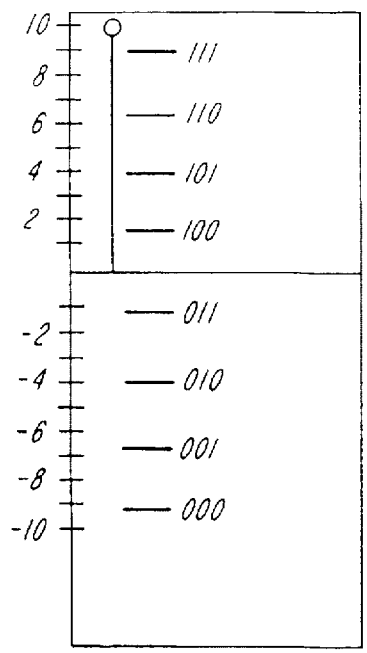
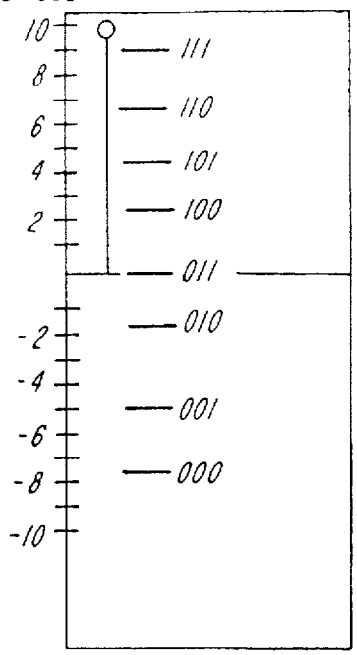
FIG. 10A  FIG. 10B
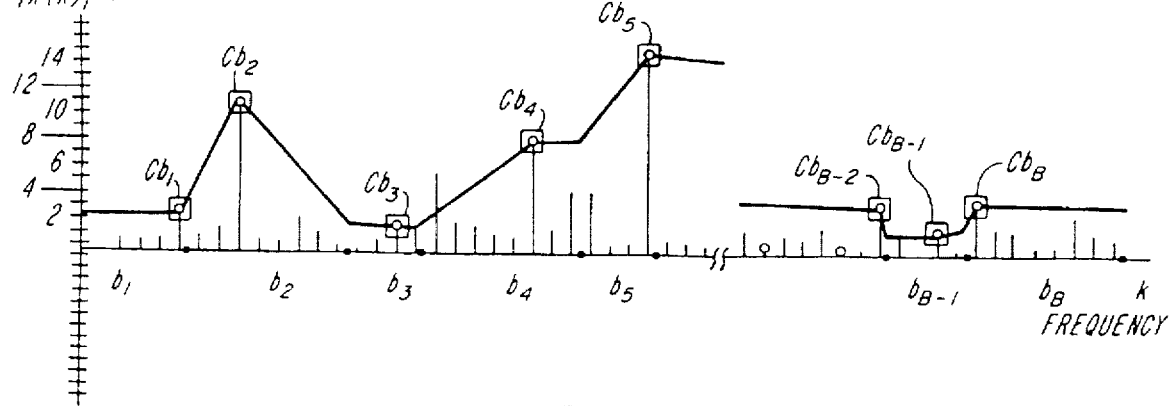
FIG. 11

ENCODING, DECODING AND COMPRESSION OF AUDIO-TYPE DATA USING REFERENCE COEFFICIENTS LOCATED WITHIN A BAND A COEFFICIENTS

RELATED APPLICATION

This is a continuation of application Ser. No. 07/879,635 filed on May 7, 1992, now U.S. Pat. No. 5,369,724, which is a continuation-in-part of Ser. No. 08/822,247, filed Jan. 17, 1992, now U.S. Pat. No. 5,394,508.

The present invention relates generally to the field of signal processing, and more specifically to data encoding and compression. The invention relates most specifically to a method and an apparatus for the encoding and compression of digital data representing audio signals or signals generally having the characteristics of audio signals.

BACKGROUND OF THE INVENTION

Audio signals are ubiquitous. They are transmitted as radio signals and as part of television signals. Other signals, such as speech, share pertinent characteristics with audio signals, such as the importance of spectral domain representations. For many applications, it is beneficial to store and transmit audio type data encoded in a digital form, rather than in an analogue form. Such encoded data is stored on various types of digital media, including compact audio discs, digital audio tape, magnetic disks, computer memory, both random access (RAM) and read only (ROM), just to name a few.

It is beneficial to minimize the amount of digital data required to adequately characterize an audio-type analogue signal. Minimizing the amount of data results in minimizing the amount of physical storage media that is required, thus reducing the cost and increasing the convenience of whatever hardware is used in conjunction with the data. Minimizing the amount of data required to characterize a given temporal portion of an audio signal also permits faster transmission of a digital representation of the audio signal over any given communication channel. This also results in a cost saving, since compressed data representing the same temporal portion of an audio signal can be sent more quickly, relative to uncompressed data, or can be sent over a communications channel having a narrower bandwidth, both of which consequences are typically less costly.

The principles of digital audio signal processing are well known and set forth in a number of sources, including Watkinson, John, *The Art of Digital Audio*, Focal Press, London (1988). An analogue audio signal x(t) is shown schematically in FIG. 1. The horizontal axis represents time. The amplitude of the signal at a time t is shown on the vertical axis. The scale of the time axis is in milliseconds, so approximately two thousandths of a second of audio signal is represented schematically in FIG. 1. A basic first step in the storage or transmission of the analogue audio signal as a digital signal is to sample the signal into discrete signal elements, which will be further processed.

Sampling the signal x(t) is shown schematically in FIG. 2. The signal x(t) is evaluated at many discrete moments in time, for example at a rate of 48 kHz. By sampling, it is meant that the amplitude of the signal x(t) is noted and recorded forty-eight thousand times per second. Thus, for a period of one msec ($1\times10^{-3}$ sec.), the signal x(t) will be sampled forty-eight times. The result is a temporal series x(n) of amplitudes, as shown in FIG. 2, with gaps between the amplitudes for the portions of the analogue audio signal x(t) which were not measured. If the sampling rate is high enough relative to the time-wise variations in the analogue signal, then the magnitudes of the sampled values will generally follow the shape of the analogue signal. As shown in FIG. 2, the sampled values follow signal x(t) rather well.

The outline of a general method of digital signal processing is shown schematically in FIG. 4a. The initial step of obtaining the audio signal is shown at 99 and the step of sampling is indicated at 102. Once the signal has been sampled, it is typically transformed from the time domain, the domain of FIGS. 1 and 2, to another domain that facilitates analysis. Typically, a signal in time can be written as a sum of a number of simple harmonic functions of time, such as $\cos\omega t$ and $\sin\omega t$, for each of the various harmonic frequencies of $\omega$. The expression of a time varying signal as a series of harmonic functions is treated generally in Feynman, R., Leighton, R., and Sands, M., *The Feynman Lectures on Physics*, Addison-Wesley Publishing Company, Reading, Mass. (1963) Vol. I, § 50, which is incorporated herein by reference. Various transformation methods (sometimes referred to as "subband" methods) exist and are well known. Baylon, David and Lim, Jae, "Transform/Subband Analysis and Synthesis of Signals," pp. 540–544, 2ssPA90, Gold Coast, Australia, Aug. 27–31 (1990). One such method is the Time-Domain Aliasing Cancellation method ("TDAC"). Another such transformation is known as the Discrete Cosine Transform ("DCT"). The transformation is achieved by applying a transformation function to the original signal. An example of a DCT transformation is:

$$X(k) = \sum_{n=o}^{N-1} 2x(n) \cdot \cos\frac{\pi}{2N} k_{(2n+1)}, \quad \text{for } 0 \le k \le N-1$$
$$= 0 \quad \text{otherwise,}$$

where k is the frequency variable and N is typically the number of samples in the window.

The transformation produces a set of amplitude coefficients of a variable other than time, typically frequency. The coefficients can be both real valued or they can be complex valued. (If X(k) is complex valued, then the present invention can be applied to the real and imaginary parts of X(k) separately, or the magnitude and phase parts of X(k) separately, for example. For purposes of discussion, it will be assumed, however, that X(k) is real valued.) A typical plot of a portion of the signal x(n) transformed to X(k) is shown schematically in FIG. 3. If the inverse of the transform operation is applied to the transformed signal X(k), then the original sampled signal x(n) will be produced.

The transform is taken by applying the transformation function to a time-wise slice of the sampled analogue signal x(n). The slice (known as a "frame") is selected by applying a window at 104 to x(n). Various windowing methods are appropriate. The windows may be applied sequentially, or, more typically, there is an overlap. The window must be consistent with the transform method, in a typical case, the TDAC method. As shown in FIG. 2, a window $w_1(n)$ is applied to x(n), and encompasses forty-eight samples, covering a duration of one msec ($1\times10^{-3}$ sec). (Forty-eight samples have been shown for illustration purposes only. In a typical application, many more samples than forty-eight are included in a window.) The window $w_2(n)$ is applied to the following msec. The windows are typically overlapped, but non-overlapping windows are shown for illustration purposes only. Transformation of signals from one domain to another, for example from time to frequency, is discussed in many basic texts, including: Oppenheim, A. V., and Schafer, R. W., *Digital Signal Processing*, Englewood Cliffs, N.J. Prentice Hall (1975); Rabiner, L. R., Gold, B., *Theory and Application of Digital Signal Processing*, Englewood Cliffs, N.J., Prentice Hall, (1975), both of which are incorporated herein by reference.

Application of the transformation, indicated at 106 of FIG. 4a, to the window of the sampled signal x(n) results in a set of coefficients for a range of discrete frequencies. Each coefficient of the transformed signal frame represents the amplitude of a component of the transformed signal at the indicated frequency. The number of frequency components is typically the same for each frame. Of course, the amplitudes of components of corresponding frequencies will differ from segment to segment.

As shown in FIG. 3, the signal X(k) is a plurality of amplitudes at discrete frequencies. This signal is referred to herein as a "spectrum" of the original signal. According to known methods, the next step is to encode the amplitudes for each of the frequencies according to some binary code, and to transmit or store the coded amplitudes.

An important task in coding signals is to allocate the fixed number of available bits to the specification of the amplitudes of the coefficients. The number of bits assigned to a coefficient, or any other signal element, is referred to herein as the "allocated number of bits" of that coefficient or signal element. This step is shown in relation to the other steps at 107 of FIG. 4a. Generally, for each frame, a fixed number of bits, N, is available. N is determined from considerations such as: the bandwidth of the communication channel over which the data will be transmitted; or the capacity of storage media; or the amount of error correction needed. As mentioned above, each frame generates the same number, C, of coefficients (even though the amplitude of some of the coefficients may be zero).

Thus, a simple method of allocating the N available bits is to distribute them evenly among the C coefficients, so that each coefficient can be specified by N/C bits. (For discussion purposes, it is assumed that N/C is an integer.) Thus, considering the transformed signal X(k) as shown in FIG. 3, the coefficient 32, having an amplitude of approximately one hundred, would be represented by a code word having the same number of bits (N/C) as would the coefficient 34, which has a much smaller amplitude, of only about ten. According to most methods of encoding, more bits are required to specify or encode a number within a larger range than are required to specify a number within a smaller range, assuming that both are specified to the same precision. For instance, to encode integers between zero and one hundred with perfect accuracy using a simple binary code, seven bits are required, while four bits are required to specify integers between zero and ten. Thus, if seven bits were allocated to each of the coefficients in the signal, then three bits would be wasted for every coefficient that could have been specified using only four bits. Where only a limited number of bits are available to allocate among many coefficients, it is important to conserve, rather than to waste bits. The waste of bits can be reduced if the range of the values is known accurately.

There are various known methods for allocating the number of bits to each coefficient. However, all such known methods result in either a significant waste of bits, or a significant sacrifice in the precision of quantizing the coefficient values. One such method is described in a paper entitled "High-Quality Audio Transform Coding at 128 Kbits/s", Davidson, G., Fielder, L., and Antill, M., of Dolby Laboratories, Inc., ICASSP, pp 1117–1120, Apr. 3–6, Albuquerque, N. Mex. (1990) (referred to herein as the "Dolby paper") which is incorporated herein by reference.

According to this method, the transform coefficients are grouped to form bands, with the widths of the bands determined by critical band analysis. Transform coefficients within one band are converted to a band block floating-point representation (exponent and mantissa). The exponents provide an estimate of the log-spectral envelope of the audio frame under examination, and are transmitted as side information to the decoder.

The log-spectral envelope is used by a dynamic bit allocation routine, which derives step-size information for an adaptive coefficient quantizer. Each frame is allocated the same number of bits, N. The dynamic bit allocation routine uses only the exponent of the peak spectral amplitude in each band to increase quantizer resolution for psychoacoustically relevant bands. Each band's mantissa is quantized to a bit resolution defined by the sum of a coarse, fixed-bit component and a fine, dynamically-allocated component. The fixed bit component is typically established without regard to the particular frame, but rather with regard to the type of signal and the portion of the frame in question. For instance, lower frequency bands may generally receive more bits as a result of the fixed bit component. The dynamically allocated component is based on the peak exponent for the band. The log-spectral estimate data is multiplexed with the fixed and adaptive mantissa bits for transmission to the decoder.

Thus the method makes a gross analysis of the maximum amplitude of a coefficient within a band of the signal, and uses this gross estimation to allocate the number of bits to that band. The gross estimate tells only the integral part of the power of 2 of the coefficient. For instance, if the coefficient is seven, the gross estimate determines that the maximum coefficient in the band is between $2^2$ and $2^3$ (four and eight), or, if it is twenty-five, that it is between $2^4$ and $2^5$ (sixteen and thirty-two). The gross estimate (which is an inaccurate estimate) causes two problems: the bit allocation is not accurate; the bits that are allocated are not used efficiently, since the range of values for any given coefficient is not known accurately. In the above procedure, each coefficient in a band is specified to the same level of accuracy as other coefficients in the band. Further, information regarding the maximum amplitude coefficients in the bands are encoded in two stages: first the exponents are encoded and transmitted as side information; second, the mantissa is transmitted along with the mantissae for the other coefficients.

In addition to determining how many bits to allocate to each coefficient for encoding that coefficient's amplitude, an encoding method must also divide the entire amplitude range into a number of amplitude divisions shown at 108 in FIG. 4a, and to allocate a code to each division, at 109. The number of bits in the code is equal to the number of bits allocated for each coefficient. The divisions are typically referred to as "quantization levels," because the actual amplitudes are quantized into the available levels, or "reconstruction levels" after coding, transmission or storage and decoding. For instance, if three bits are available for each coefficient, then $2^3$ or eight reconstruction levels can be identified.

FIG. 5 shows a simple scheme for allocating a three bit code word for each of the eight regions of amplitude between 0 and 100. The code word 000 is assigned to all coefficients whose transformed amplitude, as shown in FIG. 3, is between 0 and 12.5. Thus, all coefficients between 0 and 12.5 are quantized at the same value, typically the middle value of 6.25. The codeword 001 is assigned to all coefficients between 12.5 and 25.0, all of which are quantized to the value of 18.75. Similarly, the codeword 100 is assigned to all coefficients between 50.0 and 62.5, all of which are quantized to the value of 56.25. Rather than assigning uniform length codewords to the coefficients, with uniform quantization levels, it is also known to assign variable length codewords to encode each coefficient, and to apply non-uniform quantization levels to the coded coefficients.

It is also useful to determine a masking level. The masking level relates to human perception of acoustic signals. For a given acoustic signal, It is possible to calculate approximately the level of signal distortion (for example, quantization noise) that will not be heard or perceived, because of the signal. This is useful in various applications. For example, some signal distortion can be tolerated without the human listener noticing it. The masking level can thus be used in allocating the available bits to different coefficients.

The entire basic process of digitizing an audio signal, and synthesizing an audio signal from the encoded digital data is shown schematically in FIG. 4a and the basic apparatus is shown schematically in FIG. 4b. An audio signal, such as music, speech, traffic noise, etc., is obtained at 99 by a known device, such as a microphone. The audio signal x(t) is sampled 102, as described above and as shown in FIG. 2. The sampled signal x(n) is windowed 104 and transformed 106. After transformation (which may be a subband representation), the bits are allocated 107 among the coefficients, and the amplitudes of the coefficients are quantized 108, by assigning each to a reconstruction level and these quantized points are coded 109 by binary codewords. At this point, the data is transmitted 112 either along a communication channel or to a storage device.

The preceding steps, 102, 104, 106, 107, 108, 109, and 112 take place in hardware that is generally referred to as the "transmitter," as shown at 150 in FIG. 4b. The transmitter typically includes a signal coder (also referred to as an encoder) 156 and may include other elements that further prepare the encoded signal for transmission over a channel 160. However, all of the steps mentioned above generally take place in the coder, which may itself include multiple components.

Eventually, the data is received by a receiver 164 at the other end of the data channel 160, or is retrieved from the memory device. As is well known, the receiver includes a decoder 166 that is able to reverse the coding process of the signal coder 156 with reasonable precision. The receiver typically also includes other elements, not shown, to reverse the effect of the additional elements of the transmitter that prepare the encoded signal for transmission over channel 160. The signal decoder 166 is equipped with a codeword table, which correlates the codewords to the reconstruction levels. The data is decoded 114 from binary into the quantized reconstruction amplitude values. An inverse transform is applied 116 to each set of quantized amplitude values, resulting in a signal that is similar to a frame of x(n), i.e. it is in the time domain, and it is made up of a discrete number of values, for each inverse transformed result. However, the signal will not be exactly the same as the corresponding frame of x(n), because of the quantization into reconstruction levels and the specific representation used. The difference between the original value and the value of the reconstruction level can not typically be recovered. A stream of inverse transformed frames are combined 118, and an audio signal is reproduced 120, using known apparatus, such as a D/A convertor and an audio speaker.

OBJECTS OF THE INVENTION

Thus, the several objects of the invention include, to provide a method and apparatus for coding and decoding digital audio-type signals: which permits efficient allocation of bits such that in general, fewer bits are used to specify coefficients of smaller magnitude than are used to specify larger coefficients; which provides for a quantization of the amplitude of the coefficients such that bands including larger coefficients are divided into reconstruction levels differently from bands including only smaller coefficients, such that both smaller and larger coefficients can be specified more accurately than if the same reconstruction levels were used for all coefficients; which permits accurate estimation of the masking level; which permits efficient allocation of bits based on the masking level; which robustly localizes errors to small portions of the digitized data, and, with respect to that data, limits the error to a small, known range; and that minimizes the need to redundantly encode coefficients, all allowing a highly efficient use of available bits.

BRIEF DESCRIPTION OF THE INVENTION

In a first preferred embodiment, the invention is a method for encoding a selected aspect of a signal that is defined by signal elements that are discrete in at least one dimension, said method comprising the steps of: dividing the signal into at least one band, at least one of said at least one bands having a plurality of adjacent signal elements; in at least one band, identifying a signal element having a magnitude with a preselected size relative to other signal elements in said band and designating said signal element as a "yardstick" signal element for said band; and encoding the location of at least one yardstick signal element with respect to its position in said respective band.

In a second preferred embodiment, the invention is a method for decoding a code representing a selected aspect of a signal that is defined by signal elements that are discrete in at least one dimension, which has been encoded by a method comprising the steps of: dividing the signal into at least one band, at least one of said at least one bands having a plurality of adjacent signal elements; in at least one band, identifying a signal element having a magnitude with a preselected size relative to other signal elements in said band and designating said signal element as a "yardstick" signal element for said band; encoding the location of at least one yardstick signal element with respect to its position in said respective band; and using a function of said encoded location of said at least one yardstick signal element to encode said selected aspect of said signal; said method of decoding comprising the step of translating said encoded aspect of said signal based on a function of the location of said yardstick signal element that is appropriately inversely related to said function of the location used to encode said selected aspect of said signal.

In a third preferred embodiment, the invention is an apparatus for encoding a selected aspect of a signal that is defined by signal elements that are discrete in at least one dimension, said apparatus comprising: means for dividing the signal into at least one band, at least one of said at least one bands having a plurality of adjacent signal elements; in at least one band, means for identifying a signal element having a magnitude with a preselected size relative to other signal elements in said band and means for designating said signal element as a "yardstick" signal element for said band; means for encoding the location of at least one yardstick signal element with respect to its position in said respective band; and means for quantizing the magnitude of said at least one yardstick signal element for which the location was encoded.

In a fourth preferred embodiment, the invention is an apparatus for decoding a code representing a selected aspect of a signal that is defined by signal elements that are discrete in at least one dimension, which has been encoded by a method comprising the steps of: dividing the signal into at least one band, at least one of said at least one bands having a plurality of adjacent signal elements; in at least one band, identifying a signal element having a magnitude with a preselected size relative to other signal elements in said band and designating said signal element as a "yardstick" signal element for said band; encoding the location of at least one yardstick signal element with respect to its position in said respective band; and using a function of said encoded location of said at least one yardstick signal element to encode said selected aspect of said signal; said decoding apparatus comprising means for translating said encoded aspect of said signal based on a function of the location of said yardstick signal element that is appropriately inversely related to said function of the location used to encode said selected aspect of said signal.

In a fifth preferred embodiment, the invention is a method for encoding a selected signal element of a signal that is defined by signal elements that are discrete in at least one dimension, said method comprising the steps of: dividing the signal into a plurality of bands, at least one band having a plurality of adjacent signal elements; in each band, identifying a signal element having the greatest magnitude of any signal element in said band, and designating said signal element as a "yardstick" signal element for said band; quantizing the magnitude of each yardstick signal element to a first degree of accuracy; and allocating to said selected signal element a signal element bit allocation that is a function of the quantized magnitudes of said yardstick signal elements, said signal element bit allocation chosen such that quantization of said selected signal element using said signal element bit allocation is to a second degree of accuracy, which is less than said first degree of accuracy.

In a sixth preferred embodiment the invention is a method for encoding a selected signal element of a signal that is defined by signal elements that are discrete in at least one dimension, said method comprising the steps of: dividing the signal into a plurality of bands, at least one band having a plurality of adjacent signal elements, one of said bands including said selected signal element; in each band, identifying a signal element having the greatest magnitude of any signal element in said band, and designating said signal element as a "yardstick" signal element for said band; quantizing the magnitude of each yardstick signal element only one time; allocating to said selected signal element a signal element bit allocation that is a function of the quantized magnitudes of said yardstick signal elements.

In a seventh preferred embodiment, the invention is a method of decoding a selected signal element that has been encoded by either of the preferred methods of the invention mentioned above, said method of decoding comprising the step of translating a codeword generated by the method of encoding based on a function of the quantized magnitudes of said yardstick signal elements that is appropriately inversely related to said function of the quantized magnitudes used to allocate bits to said selected signal element.

In a eighth preferred embodiment, the invention is an apparatus for encoding a selected signal element of a signal that is defined by signal elements that are discrete in at least one dimension, said apparatus comprising: means for dividing the signal into a plurality of bands, at least one band having a plurality of adjacent signal elements, one of said bands including said selected signal element; means for identifying, in each band, a signal element having the greatest magnitude of any signal element in said band, and designating said signal element as a "yardstick" signal element for said band; means for quantizing the magnitude of each yardstick signal element to a first degree of accuracy; means for allocating to said selected signal element a signal element bit allocation that is a function of the quantized magnitudes of said yardstick signal elements, said signal element bit allocation chosen such that quantization of said selected signal element using said signal element bit allocation is to a second degree of accuracy, which is less than said first degree of accuracy.

In a ninth preferred embodiment, the invention is an apparatus for decoding a codeword representing a selected signal element of a signal that has been encoded by a method of the invention mentioned above, the apparatus comprising means for translating said codeword based on a function of the quantized magnitudes of said yardstick signal elements that is appropriately inversely related to said function of the quantized magnitudes used to allocate bits to said selected signal element.

BRIEF DESCRIPTION OF THE FIGURES

FIG. 10a shows schematically one choice for assignment of reconstruction levels to a coefficient that may have either a positive or a negative value.

FIG. 10b shows schematically another choice for assignment of reconstruction levels to a coefficient that may have either a positive or a negative value.

FIG. 11 shows schematically how the magnitudes of yardstick coefficients can be used to allocate the number of bits for a band.

DETAILED DESCRIPTION OF PREFERRED EMBODIMENTS OF THE INVENTION

Figure 1:
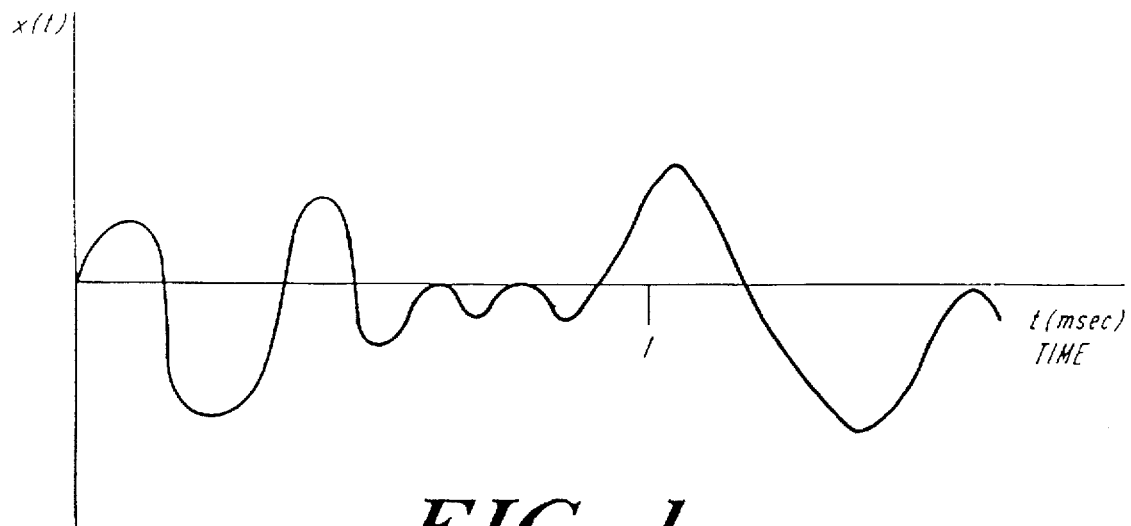
FIG. 1 shows schematically an audio-type signal.
Figure 2:
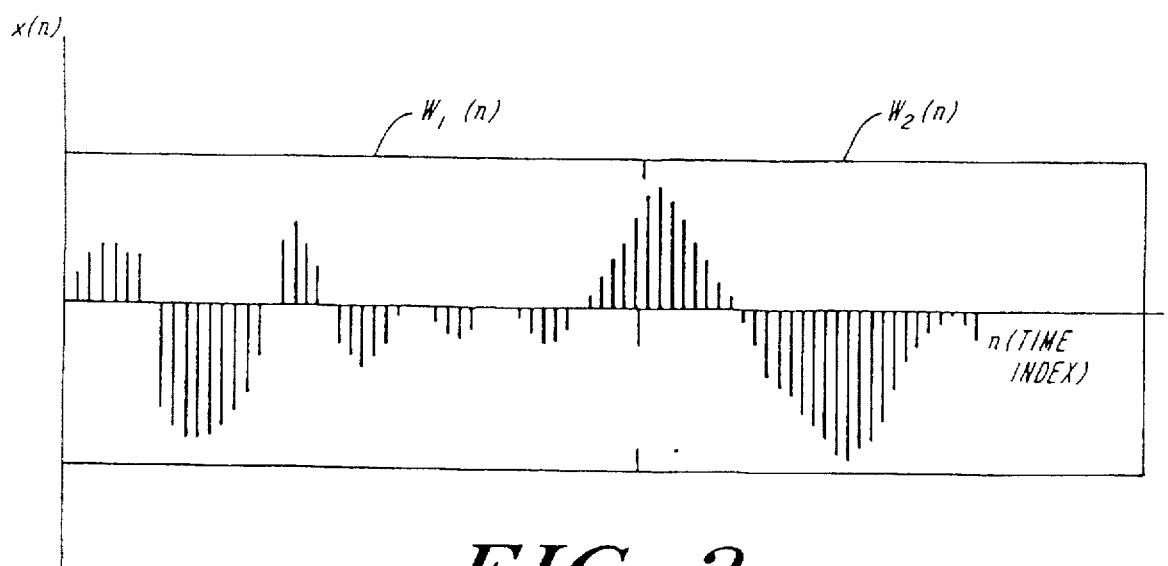
FIG. 2 shows schematically an audio-type signal that has been sampled.
Figure 3:
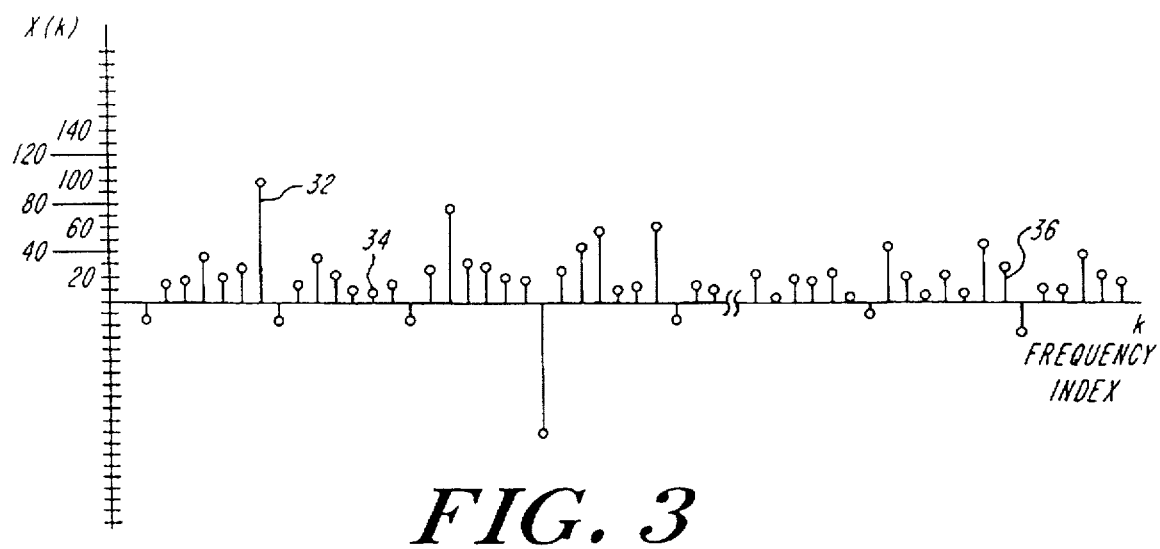
FIG. 3 shows schematically the spectrum of an audio-type signal transformed from the time domain to the frequency domain.
Figure 5:
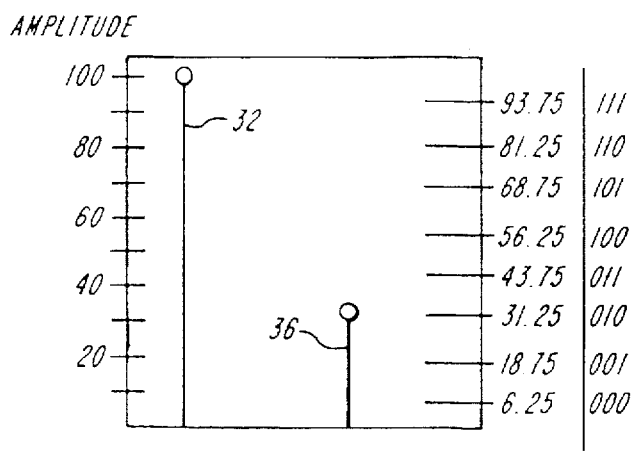
FIG. 5 shows schematically the division of the amplitude of coefficients into reconstruction levels, and the assignment of codewords thereto, according to methods known in the prior art.
Figure 4A:
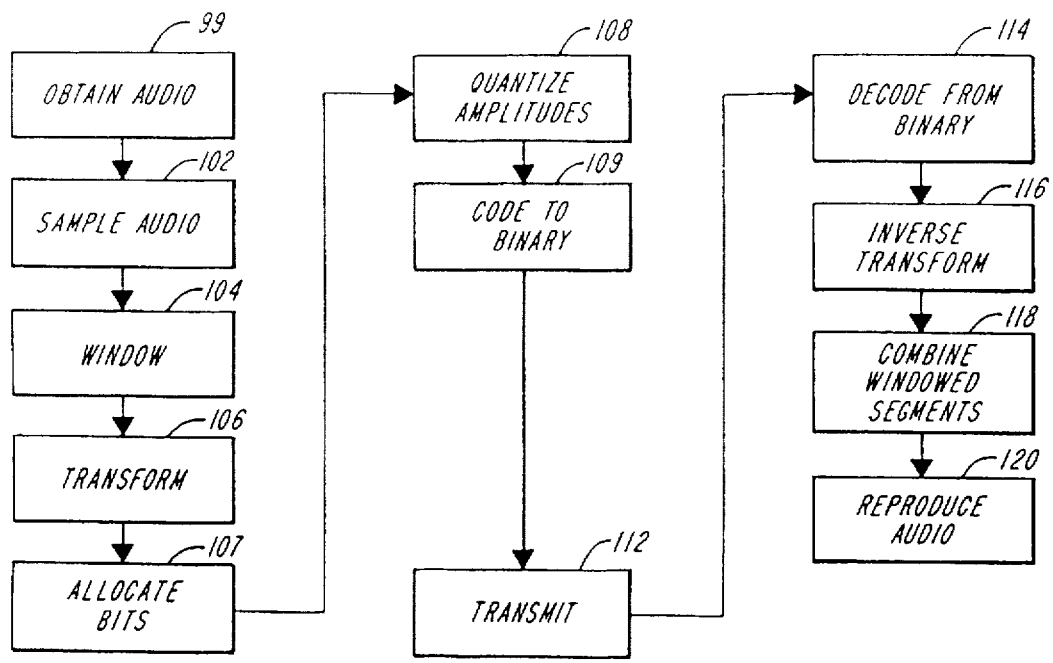
FIG. 4a shows schematically the digital processing of an audio-type signal according to known methods.
Figure 4B:
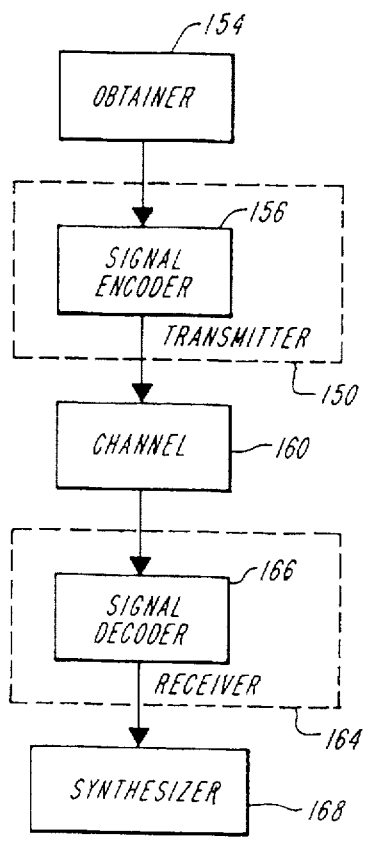
FIG. 4b shows schematically the hardware elements of a known digital signal processing system.

A first preferred embodiment of the invention is a method of allocating bits to individual coefficients, for the encoding of the magnitude (i.e. the absolute value of the amplitude) of these coefficients. According to the method of the invention, an audio signal x(t) is obtained as in FIG. 4a at 99, and sampled at a suitable rate, such as 48 kHz as at 102, resulting in x(n). The sampled signal is windowed and transformed, as at 104 and 106, according to a known, suitable technique, such as TDAC or DCT, using an appropriate window of a typical size, e.g. 512 or 1024 samples. It will be understood that other transformation and windowing techniques are within the scope of the present invention. If no transformation is performed, the invention is applied to sampled signal elements rather than coefficient signal elements. In fact, the invention is beneficially applied to non-transformed, sampled audio-type signals. Transformation is not necessary, but merely exploits certain structural characteristics of the signal. Thus, if the transformation step is skipped, it is more difficult to exploit the ordering. The result is a spectrum of coefficient signal elements in the frequency domain, such as is shown in FIG. 3. As used herein, the phrase "signal elements" shall mean portions of a signal, in general. They may be sampled portions of an untransformed signal, or coefficients of a transformed signal, or an entire signal itself. The steps of the method are shown schematically in flow chart form in FIGS. 12a, 12b and 12c.

An important aspect of the method of the invention is the method by which the total number of bits N are allocated among the total number of coefficients, C. According to the method of the invention, the number of bits allocated is correlated closely to the amplitude of the coefficient to be encoded.

The first step of the method is to divide the spectrum of transform coefficients in X(k) into a number B of bands, such as B equal sixteen or twenty-six. This step is indicated at 600 in FIG. 12a. It is not necessary for each band to include the same number of coefficients. In fact, it may be desirable to include more frequency coefficients in some bands, such as higher frequency bands, than in other, lower frequency bands. In such a case, it is beneficial to approximately follow the critical band result. An example of the spectrum X(k) (for X(k) having real values) is shown schematically in FIG. 6, divided into bands. Other typical spectra may show a more marked difference in the number of coefficients per band, typically with relatively more coefficients in the higher rather than the lower bands.

Figure 6:
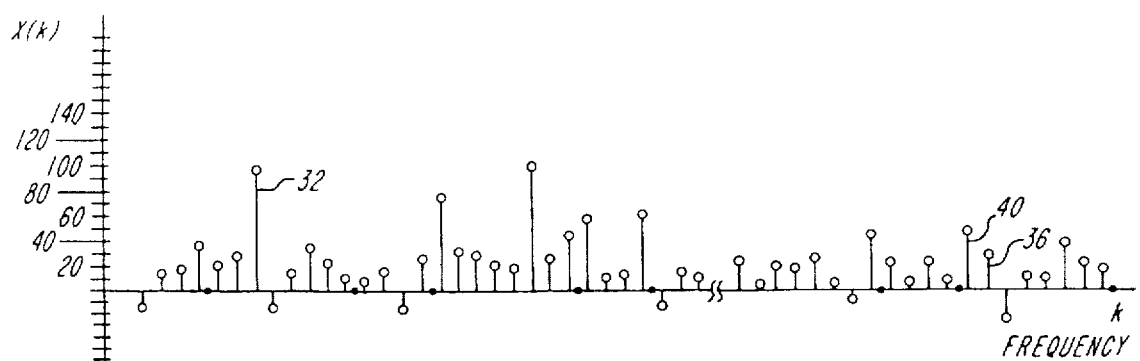
FIG. 6 shows schematically the division of a spectrum of an audio-type signals into frequency bands according to the prior art.

If the number of frequency coefficients in each band is not uniform, then the pattern of the bandwidth of each band must be known or communicated to the decoding elements of the apparatus of the invention. The non-uniform pattern can be set, and stored in memory accessible by the decoder. If, however, the bandwidth of the bands is varied "on-the-fly," based on local characteristics, then the decoder must be made aware of these variations, typically, by an explicit message indicating the pattern As shown in FIG. 6, the spectrum is divided into many bands, $b_1, b_2, \ldots b_B$, indicated by a small, dark square between bands. It is useful, as explained below, if each band is made up of a number of coefficients that equals a power of two. At this point, it is also possible to ignore frequencies that are not of interest, for instance because they are too high to be discerned by a human listener.

It may be useful, although not necessary for the invention, to analyze the spectrum coefficients in a domain where the spectrum magnitudes are compressed through non-linear mapping such as raising each magnitude to a fractional power $\alpha$, such as ½, or a logarithmic transformation. The human auditory system appears to perform some form of amplitude compression. Also, non-linear mapping such as amplitude compression tends to lead to a more uniform distribution of the amplitudes, so that a uniform quantizer is more efficient. Non-linear mapping followed by uniform quantization is an example of the well known non-uniform quantization.

Figure 7:
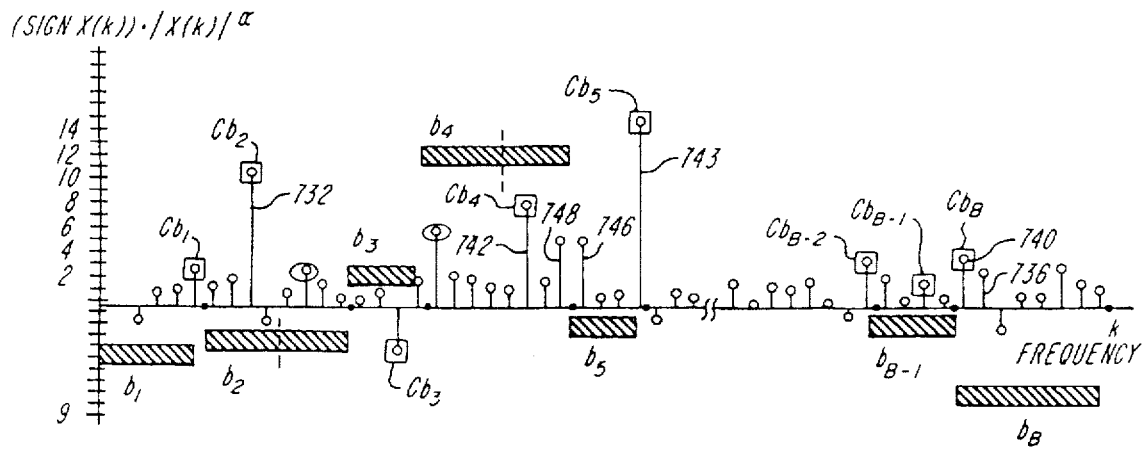
FIG. 7 shows schematically the spectrum of FIG. 6, after application of a scaling operation, further designated yardstick coefficients within bands.
Figure 12A:
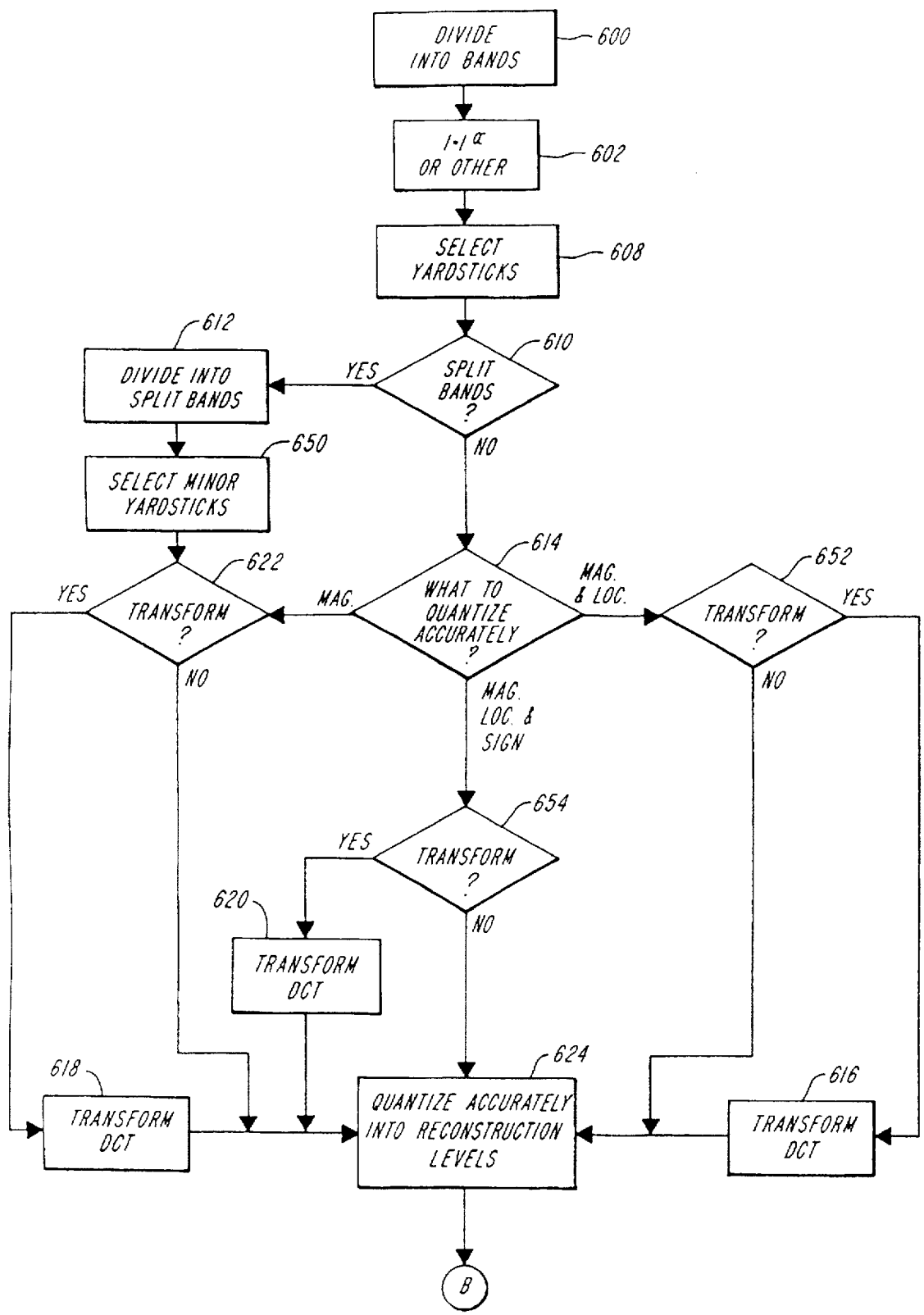
FIG. 12, in parts 12a, 12b and 12c shows schematically the steps of the method of the invention.

This step of non-linear mapping is indicated at 602 in FIG. 12a. The transformed spectrum is shown in FIG. 7, which differs from FIG. 6, in the vertical scale.

In each band of the exponentially scaled spectrum, the coefficient $Cb_1, Cb_2, \ldots Cb_B$ having the largest magnitude (ignoring sign) is designated as a "yardstick coefficient." This step is indicated at 608 in FIG. 12a. The yardstick coefficients are indicated in FIG. 7 by a small rectangle enclosing the head of the coefficient marker. (In another preferred embodiment, discussed below, rather than designating the coefficient that has the maximum coefficient in the band as the yardstick coefficient, another coefficient can be designated as the yardstick. Such other coefficient can be the one having a median or middle amplitude in the band, or a high, but not the largest magnitude in the band, such as the second or third highest. The embodiment designating the maximum magnitude coefficient as the yardstick is the predominant example discussed below, and is discussed first.)

Figure 12B:
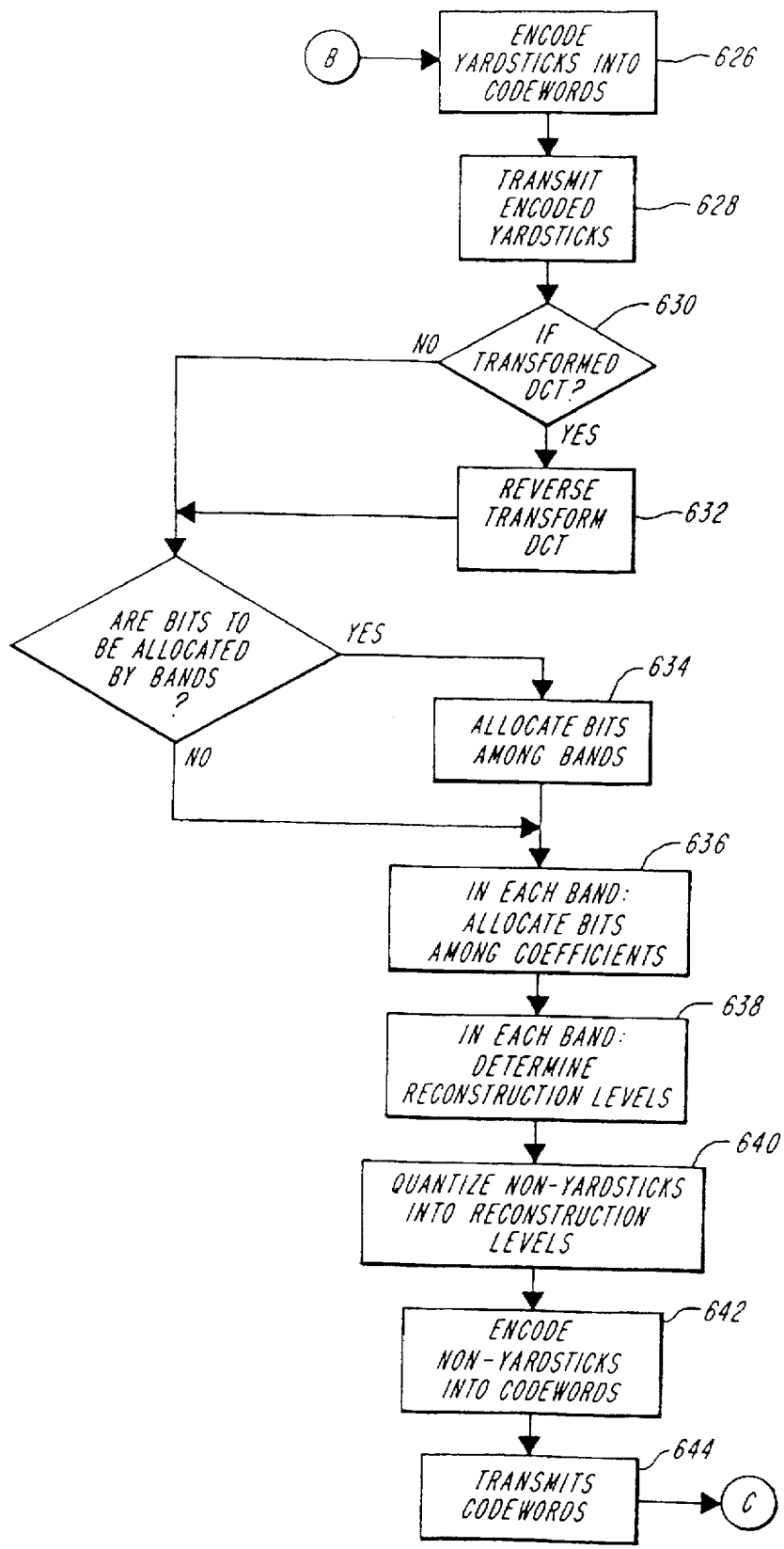

The method of the invention entails several embodiments. According to each, the magnitude of the yardstick coefficients is used to allocate bits efficiently among the coefficients, and also to establish the number and placement of reconstruction levels. These various embodiments are discussed in detail below, and are indicated in FIGS. 12a and 12b. More specific embodiments include: to further divide the spectrum X(k) into split-bands at 612; to accurately quantize the location and the sign of the yardstick coefficients at 614; and to perform various transformations on these quantized coefficients at 616, 618 and 620 before transmitting data to the decoder. However, the basic method of the invention in its broadest implementation does not employ split-bands, thus passing from split-band decision 610 to quantization decision step 614. In the basic method, only the magnitude of the yardstick coefficients is used, and thus the method passes from quantization decision step 614 to magnitude transformation decision step 622. The magnitudes need not be transformed at this stage, and thus, the basic method passes directly to step 624, where the magnitude of the yardstick coefficients are quantized accurately into reconstruction levels.

The magnitude of each of yardstick coefficient is quantized very accurately, in typical cases, more accurately than is the magnitude of non-yardstick coefficients. In some cases, this accurate rendering is manifest as using more bits to encode a yardstick coefficient (on average) than to encode a non-yardstick coefficient (on average). However, as is explained below with respect to a yardstick-only transformation step performed at step 622, this may not be the case. In general, the higher accuracy of the yardsticks (on average) is characterized by a smaller divergence between the original coefficient value and the quantized value, as compared to the divergence between the same two values for a non-yardstick coefficient (on average).

After quantization, the yardstick coefficients are encoded into codewords at 626 (FIG. 12b) and transmitted at 628 to the receiver. The coding scheme may be simple, such as applying the digital representation of the position of the reconstruction level in an ordered set of reconstruction levels, from lowest amplitude to highest. Alternatively, a more complicated coding scheme, such as using a codebook, may be used. As in the case with the receiver of the prior art, the apparatus of the invention includes a receiver having a decoder equipped to reverse the coding processes implemented by the coding apparatus. If a simple coding technique is used, the receiver may simply reverse the technique. Alternatively, a codebook may be provided, which correlates the codewords assigned to the yardstick coefficients with the reconstruction levels. Because the yardstick coefficients are quantized very accurately, when the codewords are translated and the coefficients are reconstructed, they are very close to the original values. (The next step 632 shown in FIG. 12b is only implemented if one of the transformation steps 616, 618 or 620 of FIG. 12a were conducted. The embodiments where these steps are conducted are discussed below.)

The accurately quantized magnitudes of the yardstick coefficients are used to allocate bits among the remaining coefficients in the band. Because, in this first discussed embodiment, each yardstick coefficient is the coefficient of greatest magnitude in the band of which it is a member, it is known that all of the other coefficients in the band have a magnitude less than or equal to that of the yardstick coefficient. Further, the magnitude of the yardstick coefficient is also known very precisely. Thus it is known how many coefficients must be coded in the band having the largest amplitude range, the next largest, the smallest, etc. Bits can be allocated efficiently among the bands based on this knowledge.

There are many ways that the bits can be allocated. Two significant general methods are: to allocate bits to each band, and then to each coefficient within the band; or to allocate bits directly to each coefficient without previously allocating bits to each band. According to one embodiment of the first general method, initially, the number of bits allocated for each individual band are determined at 634. More coefficients in a band will generally result in more bits being required to encode all of the coefficients of that band. Similarly, a greater average magnitude $|X(k)|^\alpha$ of the coefficients in the band will result in more bits being required to encode all of the coefficients of that band. Thus, a rough measure of the "size" of each band, "size" being defined in terms of the number of coefficients and the magnitude of the coefficients, is determined, and then the available bits are allocated among the bands in accordance with their relative sizes, larger bands getting more bits, smaller bands getting fewer bits.

Figure 7A:
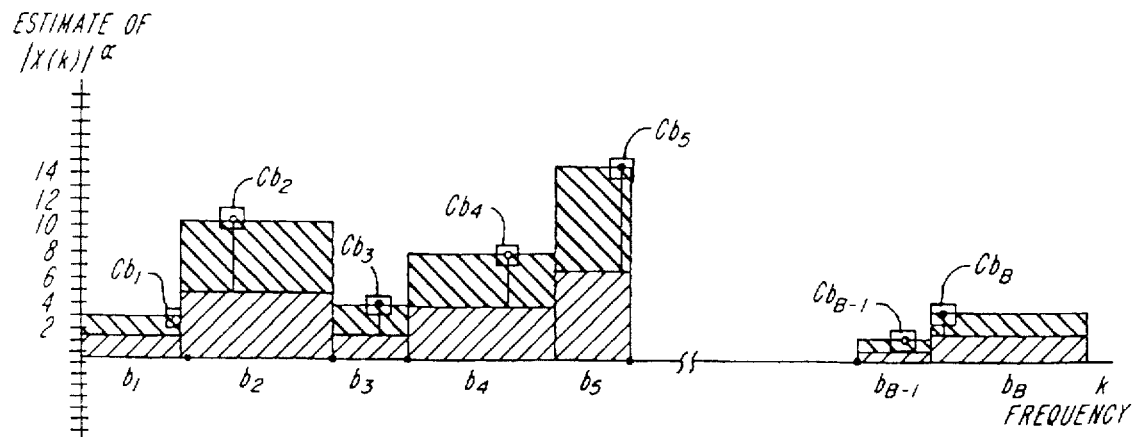
FIG. 7a shows schematically how the yardstick coefficients are used to establish a rough estimate of $|X(k)|^\alpha$.

For instance, as shown in FIG. 7a, for a very rough estimate, it can be assumed that the magnitude of each coefficient is the same as the yardstick for that band. This is indicated in FIG. 7a by a heavily cross-hatched box, having a magnitude equal to the absolute value of the amplitude of the yardstick coefficient. As can be understood from a comparison of FIG. 7 with FIG. 7a, in order to acquire a rough estimate for the size of each band, it is assumed that all coefficients are positive. Knowing the number of coefficients in each band, it is then possible to establish an upper bound for the size of the band. In an informal sense, this analysis is similar to determining the energy content of the band, as compared to the entire energy content of the frame. Once the relative sizes are determined, well known techniques are applied to allocate the available bits among the bands according to the estimated sizes. One technique is set forth at Lim, J. S., *Two-Dimensional Signal and Image Processing*, Prentice Hall, Englewood Cliffs, N.J. (1990), p. 598, incorporated herein by reference. Experience may also show that it is beneficial to allocate bits among the bands by assuming that the average magnitude $|X(k)|^\alpha$ of each non-yardstick coefficient is equal to some other fraction of the magnitude of the yardstick, such as one-half. This is shown in FIG. 7a by the less heavily cross-hatched boxes spanning the bands of the signal. It should be noted that the heavy cross-hatched regions extend all the way down to the frequency axis, although the lower portion is obscured by the less heavily cross-hatched regions.

It is also possible to adjust the estimate for the size of the band depending on the number of coefficients (also known as frequency samples) in the band. For instance, the more coefficients, the less likely it is that the average magnitude is equal to the magnitude of the yardstick coefficient. In any case, a rough estimate of the size of the band facilitates an appropriate allocation of bits to that band.

Within each band, bits are allocated at 636 among the coefficients. Typically, bits are allocated evenly, however, any reasonable rule can be applied. It should be noted that the magnitudes of the yardstick coefficients have already been quantized, encoded and transmitted and do not need to be quantized, encoded or transmitted again. According to the prior art discussed in the Dolby paper, aspects of the coefficients used to make a gross analysis of the maximum magnitude of a coefficient within a band are encoded at two different stages; first with respect to the exponent and second with respect to the mantissa.

As is mentioned above, rather than first allocating bits among the bands, and then allocating bits among the coefficients in each band, it is also possible to use the estimate of $|X(k)|^\alpha$ to allocate bits to the coefficients directly without the intermediate step of allocating bits to the bands. Again, the rough estimate $|X(k)|^\alpha$ is used to provide a rough estimate for the magnitude of every coefficient. As illustrated in FIG. 7a, the rough estimate for the magnitude of each coefficient may be the magnitude of the yardstick coefficient, or one-half that magnitude, or some other reasonable method. (As discussed below, a more complicated, yet more useful estimation is possible if information regarding the location of the yardstick coefficients is also accurately noted and encoded.) From the estimate of the magnitude of each of the coefficients, an estimate of the total magnitude or size of the signal can be made, as above, and the ratio of the size of the coefficient to the total size is used as the basis for allocating a number of bits to the coefficient. The general technique is discussed at Lim, J. S., cited above at p. 598.

Due to the accurate quantization of the yardstick coefficients, the present invention results in a more appropriate allocation of bits to coefficients in each band than does the method described in the prior art Dolby paper. Consider, for example, the two bands $b_4$ and $b_5$ (FIG. 8), having yardstick coefficients 742 and 743, respectively, with magnitudes of nine and fifteen, respectively. According to the prior art method, each yardstick coefficient is quantized grossly, by encoding only the exponent of the yardstick, and this gross quantization is used to allocate bits to all of the coefficients in the yardstick's band. Thus, yardstick coefficient 742, having a value of nine, would be quantized by the exponent "3", since it falls between $2^3$ and $2^4$. Since fifteen is the maximum number that could have this exponent, the band in which yardstick coefficient 742 falls is allocated bits as if the maximum value for any coefficient were fifteen.

Further according to the prior art method, yardstick coefficient 743, having a value of fifteen, would also be quantized by exponent "3", since it too falls between $2^3$ and $2^4$. Thus, the band in which yardstick coefficient 743 falls is also allocated bits as if the maximum value for any coefficient were fifteen. Thus, although the two bands have significantly different yardstick coefficients, each coefficient in the band is allocated the same number of bits. For illustration purposes, it can be assumed that each coefficient in the two bands is allocated four bits for quantization.

Conversely, according to the method of the invention, because the yardstick coefficients are quantized very accurately, yardstick coefficient 743, having a value of fifteen, is quantized to fifteen, or very close to fifteen if very few bits are available. Further, yardstick coefficient 742, having a value of nine, is quantized as nine, or very close to nine. Thus, the coefficients in band $b_4$ will be allocated a different number of bits than will the coefficients in band $b_5$. For purposes of illustration, it can be assumed that the coefficients in band $b^5$, having a yardstick of magnitude fifteen, are each allocated five bits, while coefficients in band $b_4$, having a yardstick of only nine, are each allocated only three bits.

Comparison to the bit allocation of the method of the invention to the prior art method shows that the allocation according to the method of the invention is much more appropriate. For band $b_5$, more bits are available (five as compared to four) so the quantization will be more accurate. For band $b_4$, fewer bits are used (three as compared to four), however, since the range is in fact smaller than the prior art method can determine (nine as compared to fifteen), the allocation of bits is more appropriate. Further, because the invention also uses the accurate yardstick quantization to establish reconstruction levels, which the method of the prior art does not, the relative accuracy achieved is even greater, as is next explained.

Figure 8:
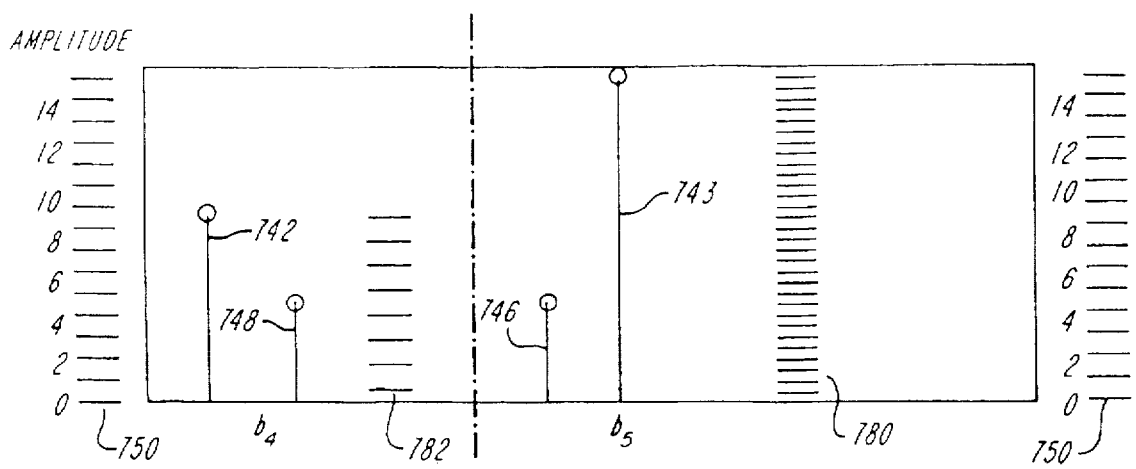
FIG. 8 shows schematically the division of the amplitude of coefficients in different bands into different reconstruction levels, according to the method of the invention.

Once each coefficient has been allocated its allotment of bits at 636, the highly accurate quantization of the yardstick coefficients can be used to divide up the entire range of the band appropriately and to assign reconstruction levels at 638. FIG. 8 shows the reconstruction level allocation schematically. The yardsticks 743 and 742 of bands $b_5$ and $b_4$ are shown, along with non-yardstick coefficients 748 and 746, the former falling in band $b_4$ and the latter falling in band $b_5$, both of which have a magnitude of five. Following through with the example considered above, allocation of reconstruction levels according to the present invention and the prior art method is illustrated. Since according to the prior art, coefficients in both bands were assigned the same number of bits, four, for reconstruction levels, each band will have $2^4$ or sixteen reconstruction levels. These reconstruction levels are shown schematically by identical scales 750 at either side of the FIG. 8. (The reconstruction levels are illustrated with a short scale line shown at the center of each reconstruction level).

The reconstruction levels that would be assigned according to the method of the invention are quite different from those of the prior art, and, in fact, differ between the two bands. In the example, band $b_5$ was assigned five bits per coefficient, so $2^5$ or thirty-two reconstruction levels are available to quantize coefficients in this band, having a yardstick of fifteen. These reconstruction levels are shown schematically at scale 780. Band $b_4$ was assigned only three bits, so $2^3$ or eight reconstruction levels are available for quantization of coefficients in this band, having a yardstick of nine. These reconstruction levels are shown at scale 782.

Comparison of the accuracy of the two methods shows that the method of the invention provides greater efficiency than does the prior art. For the coefficients in band $b_5$, the thirty-two reconstruction levels provided as a result of the five bit allocation clearly provide for more accuracy than do the sixteen levels provided as a result of the four bit allocation of the prior art. Further, all of the thirty-two reconstruction levels are useful. For the coefficients in band $b_4$, the eight reconstruction levels provided as a result of the present invention do not provide as many reconstruction levels as the sixteen provided by the prior art, however, all of the eight reconstruction levels provided are used, while several of the reconstruction levels of the prior art (those falling between nine and fifteen) can not possibly be useful for this band, since no coefficient exceeds nine. Thus, although there are technically more reconstruction levels allocated to this band as a result of the method of the prior art, many of them can not be used, and the resulting gain in accuracy is small. The bits that are consumed in the allocation of the unused reconstruction levels could be better used in the same band by reassignment of the reconstruction levels to lie in the known accurate range, or in another band (such as band $b_5$, where the maximum range is relatively large).

Figure 9A:
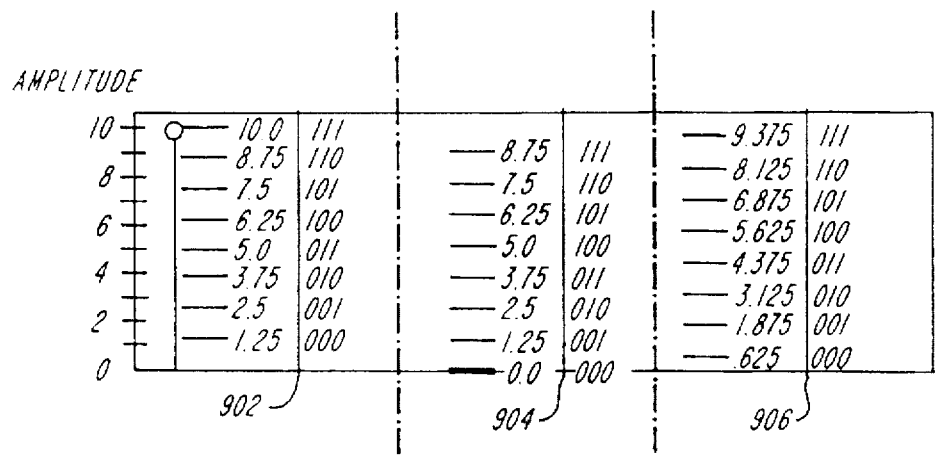
FIG. 9a shows schematically one choice for assignment of reconstruction levels to a coefficient that may have only a positive value.

The placement of the boundaries between reconstruction levels and the assignment of reconstruction values to the reconstruction levels within the range can be varied to meet specific characteristics of the signal. If uniform reconstruction levels are assigned, they can be placed as shown in FIG. 9a, at scale 902 spanning a range of ten, with the highest reconstruction level being assigned the yardstick value, and each lower level being assigned a lower value, lessened by an equal amount, depending on the level size. In such a scheme, no reconstruction level will be set to zero. Alternatively, as shown as scale 904, the lowest reconstruction level can be set to zero, with each higher level being greater by an equal amount. In such a case, no reconstruction level will be set to the yardstick. Alternatively, and more typically, as shown at scale 906, neither the yardstick nor the zero will be quantized exactly, but each will lie one-half of a reconstruction level away from the closest reconstruction level.

As in the case of uneven allocation of bits to coefficients in a band, if more than one reconstruction scheme can be applied by the encoder, then either a signal must be transmitted to the decoder along with the data pertaining to the quantized coefficients indicating which reconstruction scheme to use, or the decoder must be constructed so that in all situations, it reproduces the required distribution of reconstruction levels. This information would be transmitted or generated in a manner analogous to the manner in which the specific information pertaining to the number of coefficients per band would be transmitted or generated, as discussed above.

Figure 9B:
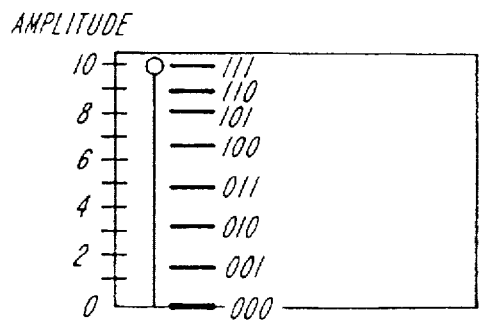
FIG. 9b shows schematically another choice for assignment of reconstruction levels to a coefficient that may have only a positive value.

Rather than divide up the amplitude of the band evenly, it may be beneficial to divide it at 638 as shown in FIG. 9b, specifying reconstruction levels that include and reconstruct exactly both zero and the yardstick coefficient, and skewing the distribution of the other reconstruction levels more toward the yardstick coefficient end of the range. Alternatively, the reconstruction levels could be clustered more closely at the zero end of the range, if experience demonstrates that this is statistically more likely. Thus, in general, the quantization levels can be non-uniform, tailored to the characteristics of the particular type of signal.

The foregoing examples have implicitly assumed that the yardstick coefficient is greater than zero and that all of the other coefficients are greater than or equal to zero. Although this can happen, many situations will arise where either or both of these assumptions will not lie. In order to specify the sign of the non-yardstick coefficients, several methods are possible. The most basic is to expand the amplitude range of the band to a range having a magnitude of twice the magnitude of the yardstick coefficient, and to assign at 638 reconstruction levels, as shown in FIG. 10a. For instance, any coefficient falling in the zone lying between amplitude values of 2.5 and 5.0, will be quantized at 640 as 3.75 and will be assigned at 642 the three bit code word "101". As will be understood, the precision of such an arrangement is only one half as fine as that which would be possible if it were only necessary to quantize positive coefficients. Negative values, such as those lying between −5.0 and −7.5 will also be quantized as −6.25 and will be assigned the codeword "001".

Rather than an equal apportionment to positive and negative values, it is possible to assign either the positive or negative reconstruction levels more finely, as shown in FIG. 10b. In such a case, it will be necessary to give more reconstruction levels to either the positive or the negative portion of the range. In FIG. 10b, the positive portion has four full reconstruction levels and part of the reconstruction level centered around zero, while the negative portion has three full reconstruction levels and part of the zero-centered reconstruction level.

The foregoing examples demonstrate that with very accurate quantization of the yardsticks, very accurate range information for a particular band can be established. Consequently, the reconstruction levels can be assigned to a particular band more appropriately, so that the reconstructed values are closer to the original values. The method of the prior art results in relatively larger ranges for any given band, and thus less appropriate assignment of reconstruction levels.

The estimation of the masking level is also improved over the prior art with application of the method of the invention. Estimation of the masking level is based upon an estimation of the magnitude of the coefficients $|X(k)|$. As has been mentioned, in general, for each coefficient, the masking level is a measure of how much noise, such as quantization noise, is tolerable in the signal without it being noticeable by a human observer. In most applications, signals of larger amplitude can withstand more noise without the noise being noticed. Factors in addition to amplitude also figure into the masking level determination, such as frequency and the amplitudes of surrounding coefficients. Thus, a better estimation of $|X(k)|$, for any given coefficient results naturally in a better estimation of an appropriate masking level. The masking level is used to fine-tune the allocation of bits to a coefficient. If the coefficient is situated such that it can tolerate a relatively high amount of quantization noise, then the bit allocation takes this into account, and may reduce the number of bits that would be allocated to a specific coefficient (or band) as compared to the number that would have been applied if the masking level were not taken into account.

Figure 12C:
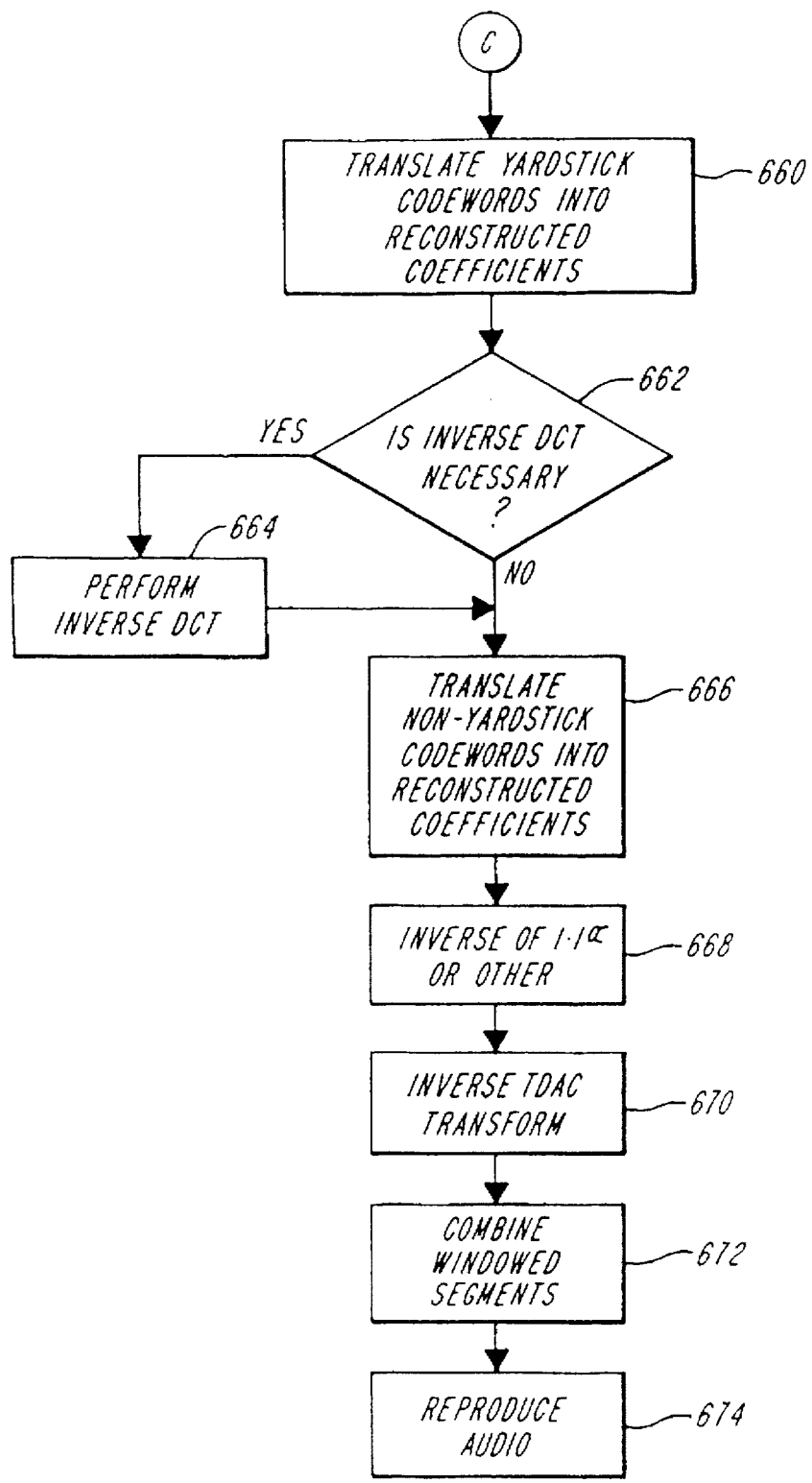

After the coefficients are encoded according to the method of the invention, the stream of codewords are transmitted at 644 to the communication channel, or storage device, as in the prior art shown in FIG. 3 at 112. After transmission, the coded words are transformed back into an audio signal. As shown in FIG. 12c, at 660 the coded yardstick coefficients are quantized based on the assignment of reconstruction levels to the codewords. The yardstick coefficients have been quantized very accurately. Thus, upon translation of the codewords into reconstructed levels, the reconstructed yardstick coefficients will very accurately reflect the original yardstick coefficients.

At 662, a decision is made whether or not to perform a reverse DCT transform (or other appropriate transform) to counteract any DCT type transform (discussed below) that may have been applied at steps 616, 618 or 620 in the encoder. If so, the reverse transform is applied at 664. If not, the method of the invention proceeds to 666, where the codewords for the non-yardstick coefficients of a single frame are translated into quantization levels. Many different schemes are possible and are discussed below.

The decoder translates the codewords into quantization levels by applying an inverse of the steps conducted at the encoder. From the yardstick coefficients, the coder has available the number of bands and the magnitudes of the yardsticks. Either from side information or from preset information, the number of non-yardstick coefficients in each band is also known. From the foregoing, the reconstruction levels (number and locations) can be established by the decoder by applying the same rule as was applied by the encoder to establish the bit allocations and reconstruction levels. If there is only one such rule, the decoder simply applies it. If there are more than one, the decoder chooses the appropriate one, either based on side information or on intrinsic characteristics of the yardstick coefficients. If the codewords have been applied to the reconstruction levels according to a simple ordered scheme, such as the binary representation of the position of the reconstruction level from lowest arithmetic value to highest, then that scheme is simply reversed to produce the reconstruction level. If a more complicated scheme is applied, such as application of a codebook, then that scheme or codebook must be accessible to the decoder.

The end result is a set of quantized coefficients for each of the frequencies that were present in the spectrum X(k). These coefficients will not be exactly the same as the original, because some information has been lost by the quantization. However, due to the more efficient allocation of bits, better range division, and enhanced masking estimation, the quantized coefficients are closer to the original than would be requantized coefficients of the prior art. (However, reconstituted non-yardstick coefficients typically do not compare to the original non-yardstick coefficients as accurately as the reconstituted yardstick coefficients compared to the original yardstick coefficients.) After requantization, the effect of the operation of raising the frame to the fractional power α, such as ½, is undone at 668 by raising the values to the reciprocal power 1/α, in this case, two. Next, at 670 the inverse transform of the TDAC type transform applied at step 106 is applied to transform the frequency information back to the time domain. The result is a segment of data, specified at the sampling rate of, for instance, 48 kHz. Sequential (typically overlapped) windows are combined at 672 and audio is synthesized at 674.

The foregoing discussion has assumed that only the magnitude of the yardstick coefficients were encoded accurately at 614, and that neither the location of the yardstick coefficient within the band (i.e. second coefficient from the low frequency end of the band, fourth coefficient from the low frequency end of the band, etc.) nor the sign (or phase) was encoded. By encoding either the location, or both of these additional facts, additional improvement in coding can be achieved. In fact, encoding of the location provides significant savings, since if not, it would be necessary to encode the yardstick coefficient twice: once to establish the estimation of $|X(k)|^\alpha$ and a second time for its contribution to the signal as a coefficient.

If the location of the yardstick coefficient had not been encoded, it would be necessary to encode its magnitude in the stream of all coefficients, for instance at step 624 shown in FIG. 12A. However, if the yardstick coefficients are fully encoded with magnitude and location and sign, then their coded values can simply be transmitted. If the location is not coded, then the apparatus must first transmit the magnitudes of each yardstick, e.g. at step 628 in FIG. 12b. Subsequently, bits are allocated to each band, and to each coefficient within the band, including the yardstick coefficient at step 636. If yardstick location information has not been stored, the system is insensitive to the special identity of the yardstick and allocates bits to it at 636, quantizes it into a reconstruction level at 640, encodes it at 642 and transmits its amplitude at 644. Thus, its amplitude is transmitted twice: first at 628 and second at 644.

If, however, the location is coded originally at 626, when the system prepares to allocate bits to the yardstick at 636, the yardstick coefficient will be identified as such, due to its location, and will be skipped, thus saving the bits necessary for coding its amplitude. Specifying the location of the yardsticks typically only improves efficiency if fewer bits are required to specify its location than to specify its amplitude. In some cases it may be beneficial to code the locations of certain yardsticks signal elements, but not all. For instance, if a band includes a great number of coefficients, it may not be advantageous to encode the location of the yardstick in that band, however it may still be beneficial to encode the location of a yardstick coefficient in a band having fewer coefficients. Further, in assessing the advantage from specifying the location of the yardstick coefficients, the probable additional computation and perhaps memory burdens required at both the coding and decoding apparatus must be considered, in light of the available data channel bandwidth. Typically, it is more cost effective to accept higher computational or memory burdens than bandwidth burdens.

If at 614 (FIG. 12a) it is decided to quantize the location of the coefficient in the band accurately, a few additional bits will be necessary to specify and encode each yardstick coefficient. Typically, the number of coefficients that will be in each band is decided before the coefficients are coded. This information is typically known to the decoder, although it is also possible to vary this information and to include it in the side information transmitted by the encoder. Thus, for each band, the location of the yardstick coefficient can be exactly specified, and it is only necessary to reserve enough bits for the location information as are required by the number of coefficients in the band in question. For this reason, it is beneficial to assign coefficients to each band numbering a power of two, so that no bits are wasted in the specification of the location of the yardstick coefficient.

As has been mentioned above, a basic method to allocate bits within the band is to allocate an equal number of bits to each non-yardstick coefficient. However, in some cases, this cannot be done, for instance when the number of bits available is not an integer multiple of the number of non-yardstick coefficients. In this case, it is frequently beneficial to give more bits to the coefficients that are closest (in location within the band) to the yardstick coefficient, because experience has shown that for audio-type signals, adjacent coefficients are often closer to each other in magnitude than are distant coefficients.

There are various other uses to which extra bits can be put. For instance, more preference can be given to coefficients lying to the left of the yardstick coefficient, i.e. of a lower frequency than the yardstick coefficient. This is in consideration of the masking result. Typically, the impact of a specific frequency component on the masking function occurs with respect to a higher frequency region than the frequency in question. Therefore, giving preference to coefficients of lower frequency than the yardstick, (thus lying to the left of the yardstick on a conventional scale such as shown in FIG. 11) will more accurately encode the coefficient that has impact on the higher frequency components. In some circumstances, it may even be beneficial to favor those lower frequency coefficients more heavily than with just the single extra bit available from an odd number of extra bits. For instance, additional bits could be given to five coefficients on the lower side of the yardstick, but only to two on the higher side.

Thus, accurately specifying the location of the yardstick coefficient within the band allows further more appropriate allocation of the bits among the various non yardstick coefficients. With more appropriate allocation of bits per non-yardstick coefficient, the division of the bits into appropriate reconstruction levels, as discussed above, is further enhanced.

Knowing the location of the yardstick coefficients also permits a better rough estimation of $|X(k)|^\alpha$, which in turn allows a better estimation of the masking function. If the locations of the yardstick coefficients are known, then the estimation of $|X(k)|^\alpha$ can be as shown in FIG. 11, rather than as shown in FIG. 7a. Without the location information, all that can be estimated is that the coefficients in the band are on average each less than some fraction of the magnitude of the yardstick coefficient. However, knowing the locations enables the typically more accurate estimation shown in FIG. 11, where each non-yardstick coefficient is assigned an estimated value based on the relationship between adjacent yardsticks. The assumption underlying such an estimation is that the magnitudes of coefficients does not change very much from one coefficient to the next, and thus, the non-yardstick coefficients will generally lie along the lines connecting the adjacent yardsticks. Thus, once the more refined estimate for the $|X(k)|^\alpha$ is acquired, the estimates for the individual coefficients can be used to implement either of the two modes of allocating bits: the bit allocation for the bands followed by the bit allocation for the coefficients; or the direct bit allocation for the coefficients. Further, this refined estimate can also be used to establish the masking level more appropriately. Thus, the bit allocation, and consequently also the range allocation, is enhanced by encoding the location of the yardsticks.

If the location of each yardstick coefficient has been specified, then it is possible without redundancy to go back to any yardsticks that have been encoded and enhance the accuracy of their coding if more bits are available than was assumed at the time of yardstick encoding. For instance, the particular band may gave received a very large number of bits due to the very large yardstick, but may not require such a large number of bits to encode the other signal elements, due to a very small number of signal elements being in the band. If the locations are known, more bits can be allocated to specifying the amplitude of the yardstick coefficient after the first pass of allocation of bits to yardsticks. If the locations are not known, it can not be done efficiently without redundancy. One way to further specify the magnitude of the yardstick would be to use the extra bits to encode the difference between the magnitude of the yardstick first encoded, and the original yardstick amplitude. Because the decoding apparatus will be employing the same routines to determine how bits have been allocated as were used by the encoder, the decoder will automatically recognize the enhanced yardstick amplitude information properly.

Additional coding efficiency and accuracy can be achieved by accurately specifying and encoding the sign of the yardstick coefficient (which corresponds to the phase of the signal components at that frequency). Only one additional bit per yardstick coefficient is necessary to encode its sign if X(k) is real-valued.

Knowing the sign of the yardstick coefficient enhances the ability of the method to efficiently determine reconstruction levels within a given band. For instance, experience indicates that a band may often include more non-yardstick coefficients having the same sign as the yardstick coefficient. Therefore, it may be beneficial to provide one or two more reconstruction levels having that sign.

Knowing the sign of the yardstick does not generally enhance estimation of the masking effect. The usefulness of the sign information varies depending upon which transform has been used.

Another preferred embodiment of the method of the invention is particularly useful if the number of bands is relatively small. This embodiment entails a further division of each band in the spectrum X(k) into two split-bands at step 612 of FIG. 12a. One split-band includes the yardstick coefficient and the other does not. The split-bands should, preferably, divide the band roughly in half. The coefficient of greatest magnitude in the split-band that does not contain the yardstick coefficient is also selected at 650 and quantized at 624. The division of two of the bands, bands $b_2$ and $b_4$ into split-bands is shown schematically in FIG. 7, by a dashed vertical line through the centers of these two bands. If this embodiment is implemented, the yardstick and additional coded coefficient are referred to herein as the major and minor yardstick coefficients respectively. This step 650 takes place between the selection of the major yardstick coefficients at 608 and the encoding of the magnitude of any yardstick coefficients at 626.

The magnitudes of the minor yardstick coefficients are also quantized accurately at 624. Because they are minor yardsticks, it is known that they are of no greater magnitude than the major yardstick coefficients. This fact can be used to save bits in their encoding.

There are various ways to divide the entire frame into, for instance, sixteen bands. One is to divide the segment from the beginning into sixteen bands. The other is to divide the entire segment into two, and then divide each part into two, and so on, with information derived from the first division being more important than information derived from the second division. Using split bands thus provides a hierarchy of important information. The first division is more important than the second division, which is more important than the next division, etc. Thus, it may be beneficial to preserve bits for the more important divisions.

As has been mentioned above, it may be beneficial to apply a second transformation to the yardsticks before quantizing, coding and transmitting at step 624, 626 and 628 respectively. This second transformation could be applied to both major and minor yardsticks, or to either major or minor yardsticks alone. This is because, depending on the nature of the signal, there may be some pattern or organization among the yardstick coefficients. As is well known, transformations take advantage of a pattern in data to reduce the amount of data information that is necessary to accurately define the data. For instance, if each yardstick coefficient were simply twice the magnitude of the preceding coefficient, it would not be necessary to quantize, code and transmit the magnitudes of all of the coefficients. It would only be necessary to code the magnitude of the first, and to apply a doubling function to the received coefficient for the required number of steps.

Thus, at step 622, 652 or 654 (depending on which of magnitude, location and sign are being quantized accurately), it is decided whether or not to apply a second transformation to the yardstick coefficients according to a known method, such as the DCT. If the nature of the data is such that it is likely to provide a more compact mode of coding, then at steps 618, 616 or 620, another transformation is applied. FIG. 12a indicates that the transformation is a DCT transformation, however, any transformation that achieves the goal of reducing the amount of data that must be transmitted can be used. Other appropriate types of transformations include the Discrete Fourier Transform.

It is because of this potential yardstick-only transformation that it is not appropriate in all cases to conclude that according to the method of the invention, the higher accuracy to which the yardstick coefficients are encoded is the result of devoting more bits to each yardstick coefficient (on average) than to each non-yardstick coefficient (on average). This is because the application of the yardstick-only transformation may result in a significant reduction in the number of bits necessary to encode all of the yardstick coefficients and thus of any single yardstick coefficient (on average). Of course, this savings in bits is achieved due to an increase in computational requirements, both in encoding and decoding. In some applications, the bit savings will justify the computational burden. In others, it may not. Both will be apparent to those of ordinary skill in the art.

If the yardsticks are twice transformed, they must be inverse transformed back into the frequency domain of X(k) at 632 in order to simplify the calculations required for bit allocation at 634, 636 and design of reconstruction levels at 638, as discussed above. Alternatively, rather than inverse transformation, the yardsticks can be stored in a memory in the encoder, and retrieved prior to step 634.

During the decoding steps of the method of the invention, the exact manner of translation at step 666 from transmitted non-yardstick codewords to quantization levels will depend on whether split bands have been used, whether location or location and sign of the yardstick coefficients have also been encoded accurately, and how that information was packaged. If side information is used to transmit control data, then that side information must be decoded and applied. If all of the information necessary is contained in memory accessible by the decoder, then the codewords need only be translated according to established algorithms.

For instance, an established algorithm may set the number of coefficients per band in the first half of the frame at sixteen and the number of coefficients per band in the second half at thirty-two. Further a rule might be established to allocate bits within a band evenly among coefficients, with any extra bits being given, one to each of the first coefficients in the band. If the sign of the yardstick coefficient is quantized, then each coefficient may be divided into reconstruction levels with one additional reconstruction level having a sign that is the same as the yardstick coefficient.

Figure 13A:
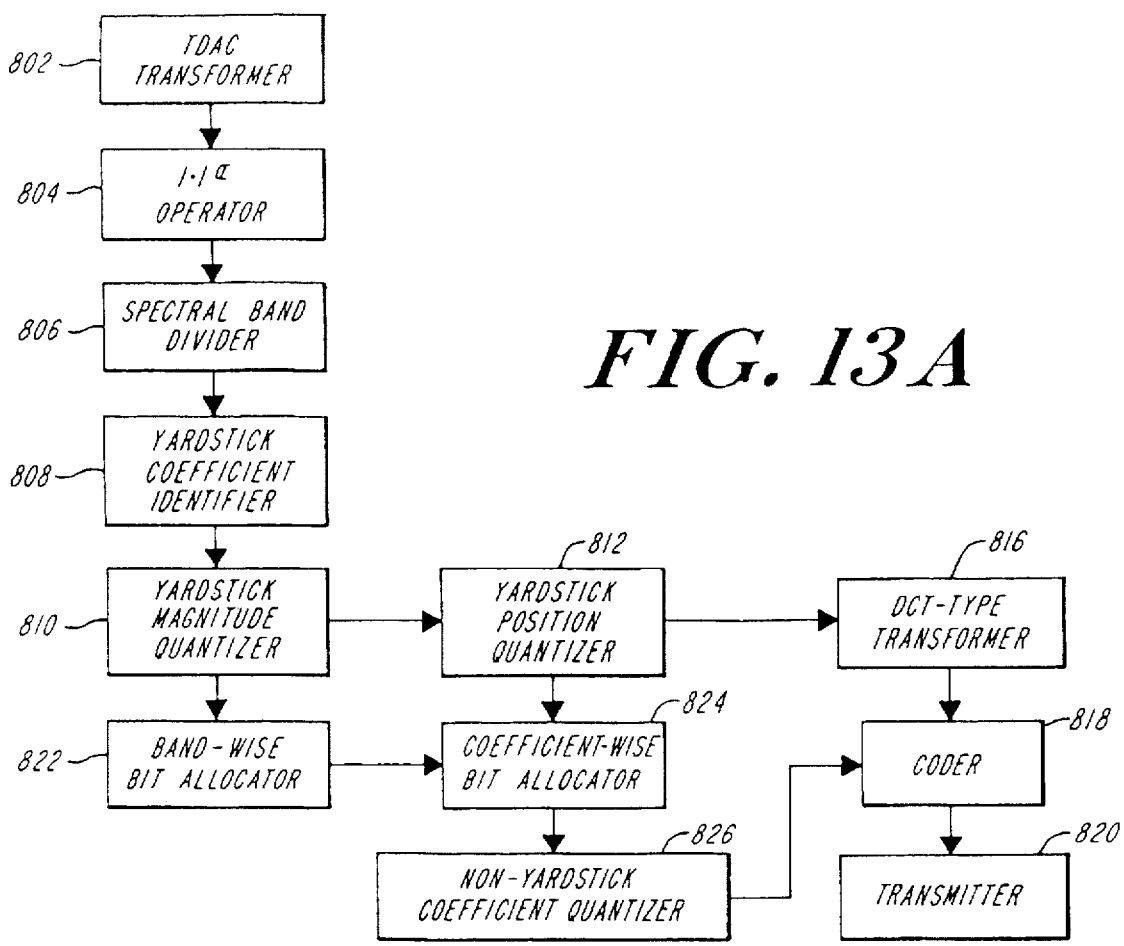
FIG. 13, in parts 13a and 13b shows schematically the components of the apparatus of the invention.
Figure 13B:
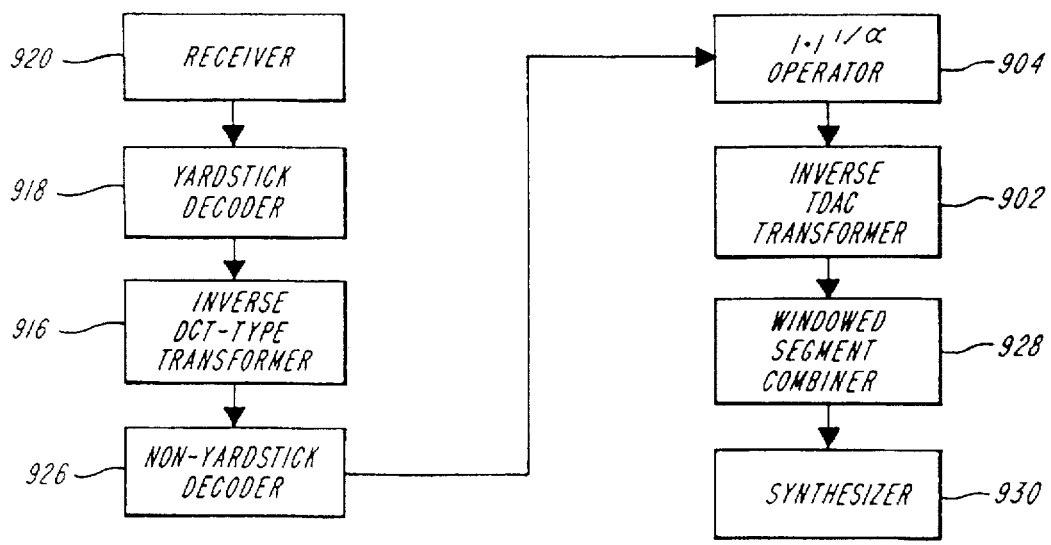

In light of the foregoing detailed discussion of the method of the invention, the apparatus of the invention will be understood from FIG. 13a, showing the transmitter portion of the apparatus, and FIG. 13b, showing the receiver portion. The apparatus of the invention can be implemented in dedicated processors or a properly programmed general purpose digital computer.

TDAC type transformer 802 transforms an audio-type signal, such as x(t) into a spectrum such as X(k). (A DCT transformer is also appropriate and within the contemplation of the invention.) The $|\ |^\alpha$ operator scales the spectrum to a domain more pertinent to human perception, or when non-uniform quantization is desired. Spectral band divider 806 divides the scaled spectrum up into separate bands. Yardstick coefficient identifier 808 identifies the coefficients in each band having the largest magnitude. Quantizers 810, and 812 quantize the magnitude of the yardstick coefficients (and perhaps the sign) and, if desired, the location within the band respectively. DCT transformer 816 applies a DCT or similar transform to the quantized yardstick information, if it is determined that enough structure exists among the yardstick coefficients to justify the additional computation. Coder 818 encodes the quantized yardstick information, whether or not the DCT transformer operates upon the information, producing a series of codewords, which are transmitted by transmitter 820 onto a data channel.

In a preferred embodiment, band-wise bit allocator 822 takes the information from the yardstick magnitude quantizers 810 and uses that information to establish a rough estimate of $|X(k)|^\alpha$ as shown in FIG. 7a, and uses this estimate to allocate the limited number of available bits among the bands in the spectrum established by spectral band divider 806. Coefficient-wise bit allocator 824 uses the information from the yardstick position and sign quantizers 812 and 814 along with the allocation of bits within the band to allocate the band's bits among the coefficients in that band. Non-yardstick quantizer 826 uses the same information to establish appropriate reconstruction levels for each coefficient in the band and to quantize each coefficient. The quantized coefficients are passed to coder 818, which assigns a codeword to each non-yardstick coefficient and passes the codewords on to transmitter 820 for transmission.

In another preferred embodiment of the apparatus, the band-wise bit allocator can also take information from the yardstick position quantizer 812 in establishing the rough estimate of $|X(k)|^\alpha$. The band-wise bit allocator would establish a rough estimate as shown in FIG. 11 if the location information is used, and from this estimate, would allocate bits to the bands.

In another embodiment of the apparatus of the invention, the bandwise bit allocator 822 also takes sign information from magnitude quantizer 810 and location information from location quantizer 812 to allocate bits to the band, as discussed above with respect to the method of the invention.

The receiver or decoder portion of the invention is shown schematically in FIG. 13b. Receiver 920 receives the codewords from the communication channel. Yardstick decoder 918 decodes the yardstick data, resulting in quantized data that represents the yardsticks. Reverse DCT transformer 916 undoes the effect of any DCT type transformation that was applied at 816, resulting in a set of scaled yardstick coefficients that are very close in magnitude to the original scaled yardstick coefficients before quantization in magnitude quantizer 810. Non-yardstick decoder 926 receives the codewords representing the non-yardstick coefficients and translates those coefficients into reconstructed non-yardstick coefficients. As has been mentioned above in connection with the method, the operation of decoder 926 will depend on the means by which the non-yardstick information was coded. Operator 904 raises the quantized coefficients in the reconstructed spectrum to the power of $1/\alpha$, to undo the effect of operator 804. Reverse transformer 902 applies an inverse transform to the spectrum to undo the effect of the TDAC transformer 802, and to transform the signal from the frequency domain back to a time domain, resulting in a windowed time domain segment. Combiner 928 combines the separate sampled windows, and synthesizer 930 synthesizes an audio-type signal.

Another preferred embodiment of the encoder omits the band-wise bit allocator and includes only a coefficient-wise bit allocator, which takes the estimate of $|X(k)|^\alpha$ and uses that to directly allocate bits to the coefficients, as described above with respect to the method of the invention.

The foregoing discussion of method and apparatus has assumed that the yardstick coefficients are the coefficients having the maximum absolute value of amplitude in the band. It is also beneficial to use a coefficient other than the maximum magnitude as the reference yardstick against which the others are measured. For instance, although it is believed that optimal results will be achieved using the maximum amplitude coefficient, beneficial results could be obtained by using a coefficient having an amplitude near to the greatest, such as the second or third greatest. Such a method is also within the contemplation of the invention and is intended to be covered by the attached claims.

The reference yardstick may also be the coefficient having a magnitude that is closest among all of the magnitudes of other coefficients in the band to the middle or median coefficient in the band. A middle value yardstick is beneficial in cases where the statistical characteristics of the signal are such that the middle, or median value contains more information about the total energy in the signal than does the maximum value in a band. This would be the case if the typical signal is characterized by excursions within a steady range above and below a middle value. It would also be necessary to characterize or estimate a range for the magnitude of the excursions. For example, if the middle value of a band had a value of positive five, and it were known from the statistics of the type of signal that such signal values typically diverge from the median by only ±four units, the range would be set from positive one to positive nine, and reconstruction levels would be established within the range. As before, the reconstruction levels can be evenly divided, or can be concentrated more around the middle value, or skewed toward either end of the range, depending upon statistical information about the particular class of signal.

Similarly, the yardstick coefficient may be the coefficient having a magnitude that is closest to the average of all of the magnitudes of the other coefficients in the band. Such an average value is useful if the average value represents a better estimate of the energy in the band than any other value, for instance the maximum or the median values.

The invention has been discussed above with respect to a signal that has been divided into a plurality of bands, and this is expected to be the application for which the invention provides the greatest benefits. However, the invention is also useful in connection with coding the amplitudes of a plurality of coefficients in only a single band. Application of the invention to a signal or signal component on only a single band follows the same principles as the application to multi-band signals discussed above. The yardstick is selected, and quantized accurately, preferably although not necessarily encoding the location and the sign of the yardstick. The accurate quantization of the yardstick is used in conjunction with the number of available bits to establish reconstruction levels and to allocate bits among the non yardstick coefficients. All of the considerations discussed above apply to the single band embodiment, except that the number of bits available for the band will be determined, and will not depend on the specifics of other bands, if any.

The present invention has many benefits. The bits related to bit allocation, such as the magnitude of the yardstick coefficient as well as their locations and signs, will be well protected. Thus, any error that occurs will be localized to one particular band and will not be any larger than the magnitude of the yardstick coefficient in each band. The yardstick coefficients will always be accurately represented. The yardstick amplitude information is not discarded as in some prior art methods, but is used very efficiently for its own direct use and for bit allocation. Relative to the method discussed in the Dolby paper, the invention uses the available bits more efficiently. In the Dolby method, the exponents of the peak spectral values for each band are encoded. Thus, a gross estimate of the amplitude of a band is first made. Subsequently, all of the coefficients, including the peak coefficient are encoded and transmitted using a finer estimate of their magnitude. Thus, the accuracy of the peak amplitudes is the same as that of other coefficients in the same band. Further, the accuracy of the yardstick coefficients in the present invention ensures that accurate ranges are used for determining reconstruction levels, which allows more efficient use of available bits.

In addition to the foregoing specific implementations of the method and apparatus of the invention, additional variations are within the intended scope of the claims. It is possible to incorporate techniques that take into account the perceptual properties of human observers, in addition to, the estimation of the masking level.

Further, more than one frame at a time may be considered. For instance, in the special case of silence, bits can be taken away from the frame in which the silence occurs, and given to another. In less extreme cases, it may still be appropriate to devote fewer bits to one frame than another. The establishment of bands can be done "on-the-fly", by including in a band sequential coefficients that are close to each other, and then beginning a new band upon a coefficient of significantly different magnitude.

The method and apparatus of the invention can also be applied to any data that is encoded, for instance to two-dimensional signals. The data need not have been transformed. The invention can be applied to time domain samples x(n), except that in the case of audio, the results will not be as good as they would be if the data were transformed. Transformation is typically applied to data to exploit patterns within the data. However, transformation need not be applied and, in some cases, where the data tends toward randomness, it is not typically beneficial. In the case of time domain samples the coefficients will, in fact be sampled signal elements having sampled amplitudes of the actual sampled signal, rather than some transformation thereof into another domain. The method of the invention is applied in the same fashion, excluding the transformation and inverse transformation steps. Similarly, the apparatus of the invention would in that case not require the forward and inverse transform operators. (It might,however, still be beneficial to perform the yardstick-only transformation.)

Further, interaction between frames can also be implemented.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. A method for encoding a selected aspect of a signal that is defined by signal elements that are discrete in at least one dimension, said method comprising the steps of:

a. dividing the signal into at least one band, at least one of said at least one band(s) having a plurality of adjacent signal elements;

b. in at least one band, identifying a signal element having a magnitude with a preselected size relative to other signal elements in said at least one band(s) and designating said signal element as a "yardstick" signal element for said at least one band(s); and c. encoding the location of at least one yardstick signal element(s) with respect to its position along said at least one dimension in which said signal elements are discrete within its respective band.

2. The method of claim 1, further comprising the step of quantizing the magnitude of said at least one yardstick signal element(s) for which the location was encoded.

3. The method of claim 2, at least one of said yardstick signal elements having a magnitude that is greater than the magnitude of any other signal element in its respective band.

4. The method of claim 2, at least one of said yardstick signal elements having a magnitude that is greater than the magnitude of all but one other signal elements in its respective band.

5. The method of claim 2, at least one of said yardstick signal elements having a magnitude that is greater than the magnitude of all but a preselected number of other signal elements in its respective band.

6. A method for decoding a code representing a selected aspect of a signal that is defined by signal elements that are discrete in at least one dimension, which code has been encoded by a method comprising the steps of:

a. dividing the signal into at least one band, at least one of said at least one band(s) having a plurality of adjacent signal elements;

b. in at least one band, identifying a signal element having a magnitude with a preselected size relative to other signal elements in said at least one band(s) and designating said signal element as a "yardstick" signal element for said at least one band(s);

c. encoding the location of at least one yardstick signal element(s) with respect to its position along said at least one dimension in which said signal elements are discrete within its respective band;

d. quantizing the magnitude(s) of said at least one yardstick signal element(s) for which the location was encoded; and e. using a function of said encoded location(s) and magnitude(s) of said at least one yardstick signal element(s) to encode said selected aspect of said signal;

said method of decoding comprising the step of translating said code based on a function that is appropriately inversely related to said function of the location(s) and magnitude(s) used to encode said code.

7. An apparatus for encoding a selected aspect of a signal that is defined by signal elements that are discrete in at least one dimension, said apparatus comprising:

a. means for dividing the signal into at least one band, at least one of said at least one band(s) having a plurality of adjacent signal elements;

b. in at least one band, means for identifying a signal element having a magnitude with a preselected size relative to other signal elements in said at least one band(s) and means for designating said signal element as a "yardstick" signal element for said band;

c. means for encoding the location of at least one yardstick signal element(s) with respect to its position along said at least one dimension in which said signal elements are discrete within its respective band; and d. means for quantizing the magnitude of said at least one yardstick signal element(s) for which the location was encoded.

8. An apparatus for decoding a code representing a selected aspect of a signal that is defined by signal elements that are discrete in at least one dimension, which code has been encoded by an apparatus comprising:

a. means for dividing the signal into at least one band, at least one of said at least one band(s) having a plurality of adjacent signal elements;

b. means for, in at least one band, identifying a signal element having a magnitude with a preselected size relative to other signal elements in said at least one band(s) and designating said signal element as a "yardstick" signal element for said at least one band(s);

c. means for encoding the location of at least one yardstick signal element(s) with respect to its position along said at least one dimension in which said signal elements are discrete within its respective band;

d. means for quantizing the magnitude of said at least one yardstick signal element(s) for which the location was encoded; and e. means for using a function of said encoded location and magnitude of said at least one yardstick signal element(s) to encode said selected aspect of said signal;

said decoding apparatus comprising:

i. a yardstick location decoder; and ii. a code translator that applies a translating rule that is appropriately inversely related to said function of the location and magnitude used to encode said selected aspect of said signal.

* * * * *

UNITED STATES PATENT AND TRADEMARK OFFICE
CERTIFICATE OF CORRECTION

PATENT NO. : 5,640,486
DATED : June 17, 1997
INVENTOR(S) : Lim

It is certified that error appears in the above-indentified patent and that said Letters Patent is hereby corrected as shown below:

Cover page, item [54], correction of title from:

"ENCODING, DECODING AND COMPRESSION OF AUDIO-TYPE DATA USING REFERENCE COEFFICIENTS LOCATED WITHIN A BAND A COEFFICIENTS" to

--ENCODING, DECODING AND COMPRESSION OF AUDIO-TYPE DATA USING REFERENCE COEFFEICIENTS LOCATED WITHIN A BAND OF COEFFICIENTS-- to read:

"ENCODING, DECODING AND COMPRESSION OF AUDIO-TYPE DATA USING REFERENCE COEFFICIENTS LOCATED WITHIN A BAND OF COEFFICIENTS"

UNITED STATES PATENT AND TRADEMARK OFFICE
CERTIFICATE OF CORRECTION

PATENT NO. : 5,640,486
DATED : June 17, 1997
INVENTOR(S) : Lim

It is certified that error appears in the above-indentified patent and that said Letters Patent is hereby corrected as shown below:

Cover page, item [*], correction of Patent Number referenced from

"The term of this patent shall not extend beyond the expiration date of Pat. No. 5,364,724" to --The term of this patent shall not extend beyond the expiration date of Pat. No. 5,369,724--

Signed and Sealed this

Sixteenth Day of September, 1997

Attest:

BRUCE LEHMAN

Attesting Officer

Commissioner of Patents and Trademarks